US012759298B2

(12) United States Patent
Matsushita

(10) Patent No.: US 12,759,298 B2
(45) Date of Patent: Oct. 13, 2026

(54) LIQUID EJECTING APPARATUS AND LIQUID EJECTING HEAD

(71) Applicant: SEIKO EPSON CORPORATION, Tokyo (JP)

(72) Inventor: Junichiro Matsushita, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 190 days.

(21) Appl. No.: 18/922,836

(22) Filed: Oct. 22, 2024

(65) Prior Publication Data

US 2025/0042156 A1 Feb. 6, 2025

Related U.S. Application Data

(63) Continuation of application No. 17/822,943, filed on Aug. 29, 2022, now Pat. No. 12,194,747.

(30) Foreign Application Priority Data

Aug. 31, 2021 (JP) ................................ 2021-140977

(51) Int. Cl.
*B41J 25/00* (2006.01)
*B41J 2/14* (2006.01)
*B41J 2/165* (2006.01)

(52) U.S. Cl.
CPC ........... *B41J 2/1652* (2013.01); *B41J 2/1433* (2013.01)

(58) Field of Classification Search
None
See application file for complete search history.

(56) References Cited

U.S. PATENT DOCUMENTS 7,097,297 B2 * 8/2006 Hasebe .............. B41J 11/00214 347/101
2016/0361925 A1 12/2016 Ozaki
2018/0326730 A1 * 11/2018 Kohnotoh ................ B41J 11/02
2019/0009522 A1 1/2019 Fukasawa et al.
2019/0111703 A1 * 4/2019 Nakagawa ............ C09D 11/32

FOREIGN PATENT DOCUMENTS

JP H04-146154 5/1995
JP 2015047730 3/2015
JP 2019-014147 1/2019
JP 2020-006576 A 1/2020

* cited by examiner

*Primary Examiner* — Scott A Richmond
(74) *Attorney, Agent, or Firm* — WORKMAN NYDEGGER

(57) ABSTRACT

There is provided a liquid ejecting apparatus including: a liquid ejecting head having an ejection surface including a first nozzle row configured to eject a first ink and a second nozzle row configured to eject a second ink; and a support configured to support the liquid ejecting head in an inclined posture in which the ejection surface is inclined with respect to a horizontal plane, in which the first nozzle row is positioned above the second nozzle row with respect to a vertical direction in a state where the support supports the liquid ejecting head in the inclined posture, and a thickening resistance of the second ink is higher than a thickening resistance of the first ink.

14 Claims, 6 Drawing Sheets

LIQUID EJECTING APPARATUS AND LIQUID EJECTING HEAD

The present application is a continuation of U.S. patent application Ser. No. 17/822,943, filed Aug. 29, 2022, which is based on, and claims priority from JP Application Serial Number 2021-140977, filed Aug. 31, 2021, the disclosures of which are hereby incorporated by reference herein in their entirety.

BACKGROUND

1. Technical Field

The present disclosure relates to a liquid ejecting apparatus and a liquid ejecting head.

2. Related Art

A liquid ejecting apparatus represented by an ink jet printer generally includes a liquid ejecting head that ejects ink. The liquid ejecting head has an ejection surface including a nozzle for ejecting ink, and for example, as disclosed in JP-A-2020-6576, the liquid ejecting head may be installed in a state where the ejection surface is inclined with respect to a horizontal plane.

In the apparatus described in JP-A-2020-6576, when a plurality of nozzle rows for ejecting inks different from each other are provided on the ejection surface, the plurality of nozzle rows are arranged at different positions in the vertical direction. As described above, in the configuration in which the plurality of nozzle rows are arranged at different positions in the vertical direction, there is a problem that the difference in thickening of ink between the nozzle rows becomes large due to this arrangement.

SUMMARY

According to an aspect of the present disclosure, there is provided a liquid ejecting apparatus including: a liquid ejecting head having an ejection surface including a first nozzle row for ejecting a first ink and a second nozzle row for ejecting a second ink; and a support configured to support the liquid ejecting head in an inclined posture in which the ejection surface is inclined with respect to a horizontal plane, in which the first nozzle row is positioned above the second nozzle row in a vertical direction in a state where the support supports the liquid ejecting head in the inclined posture, and a thickening resistance of the second ink is higher than a thickening resistance of the first ink.

According to another aspect of the present disclosure, there is provided a liquid ejecting apparatus including: a first liquid ejecting head having a first ejection surface including a plurality of first nozzles for ejecting a first ink; a second liquid ejecting head having a second ejection surface including a plurality of second nozzles for ejecting a second ink; a recessed first cap that covers the first ejection surface in a first posture in which an angle formed by the first ejection surface and a horizontal plane is a first angle; and a recessed second cap that covers the second ejection surface in a second posture in which an angle formed by the second ejection surface and the horizontal plane is a second angle larger than the first angle, in which the first ink and the second ink respectively contains a moisturizer, and a thickening resistance of the second ink is higher than a thickening resistance of the first ink.

According to still another aspect of the present disclosure, there is provided a liquid ejecting head having an ejection surface including a first nozzle row for ejecting a first ink, a second nozzle row for ejecting a second ink, and a third nozzle row for ejecting a third ink, in which the third nozzle row is positioned between the first nozzle row and the second nozzle row, and a thickening resistance of the third ink is higher than a thickening resistance of the first ink and lower than a thickening resistance of the second ink.

DESCRIPTION OF EXEMPLARY EMBODIMENTS

Figure 1:
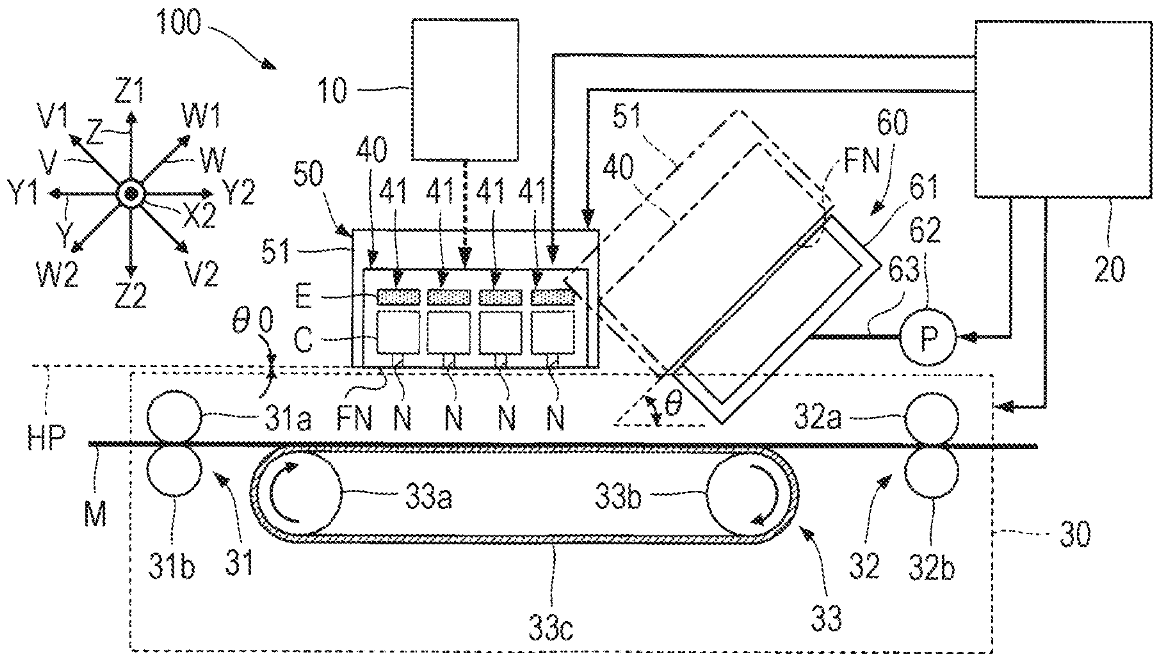
FIG. 1 is a schematic view illustrating a configuration example of a liquid ejecting apparatus according to a first embodiment.

Hereinafter, preferred embodiments according to the present disclosure will be described with reference to the attached drawings. In the drawings, the dimensions and scale of each part may differ from the actual ones, and some parts are schematically illustrated for ease of understanding. Further, the scope of the present disclosure is not limited to these aspects unless otherwise stated to limit the disclosure in the following description.

In the following description, an X axis, a Y axis, and a Z axis that intersect each other are appropriately used. In the following, one direction along the X axis is an X1 direction, and the direction opposite to the X1 direction is an X2 direction. Similarly, the directions opposite to each other along the Y axis are a Y1 direction and a Y2 direction. The directions opposite to each other along the Z axis are a Z1 direction and a Z2 direction. The X1 direction or the X2 direction is an example of the "first direction".

Here, the Z axis is a vertical axis, and the Z2 direction corresponds to a downward direction in the vertical direction. The downward direction in the vertical direction is equal to a gravity direction. Therefore, the plane orthogonal to the Z axis corresponds to the horizontal plane. Further, in the present embodiment, since the X axis, the Y axis, and the Z axis are typically orthogonal to each other, the horizontal plane is defined by the X axis and the Y axis. In addition, the X axis, the Y axis, and the Z axis are typically orthogonal to each other, but are not limited thereto, and may intersect each other at an angle within the range of 80° or more and 1000 or less, for example.

Further, in the following description, in addition to the X axis, the Y axis and the Z axis, the V axis and the W axis may be used. Each of the V axis and the W axis is an axis inclined with respect to the horizontal plane. Here, the V axis of the present embodiment is an axis parallel to the normal line of an ejection surface FN at the time of being in the inclined posture described later, that is, at the time of capping described later, is orthogonal to the X axis, and is inclined with respect to the Z axis. The directions opposite to each other along the V axis are a V1 direction and a V2 direction. The V2 direction is a direction of the normal vector of the ejection surface FN at the time of being in the inclined posture described later, that is, at the time of capping described later. The W axis is an axis orthogonal to both the X axis and the V axis. The directions opposite to each other along the W axis are a W1 direction and a W2 direction. The W1 direction or the W2 direction is an example of the "second direction".

1. First Embodiment

1-1. Liquid Ejecting Apparatus

FIG. 1 is a schematic view illustrating a configuration example of a liquid ejecting apparatus 100 according to a first embodiment. The liquid ejecting apparatus 100 is an ink jet type printing apparatus that ejects ink, which is an example of a liquid, as droplets onto a medium M. The liquid ejecting apparatus 100 of the present embodiment is a so-called line type printing apparatus in which a plurality of nozzles for ejecting ink are distributed over the entire range in the width direction of the medium M. The medium M is typically a printing paper sheet. The medium M is not limited to a printing paper sheet, and may be a printing target of any material such as a resin film or cloth.

The liquid ejecting apparatus 100 includes a liquid container 10, a control unit 20, a transport mechanism 30, a liquid ejecting head 40, a support mechanism 50, and a maintenance mechanism 60.

The liquid container 10 stores ink. Specific examples of the liquid container 10 include a cartridge that is attachable to and detachable from the liquid ejecting apparatus 100, a bag-like ink pack formed of a flexible film, an ink tank that can be refilled with ink, and the like. Any type of ink may be stored in the liquid container 10.

Although not illustrated, the liquid container 10 of the present embodiment includes a first liquid container for storing the first ink, a second liquid container for storing the second ink, a third liquid container for storing the third ink, and a fourth liquid container for storing the fourth ink. The first ink, the second ink, the third ink, and the fourth ink are different from each other. In particular, the thickening resistances of the first ink, the second ink, the third ink, and the fourth ink are different from each other. These inks will be described in detail later.

The control unit 20 controls the operation of each element of the liquid ejecting apparatus 100. The control unit 20 includes a processing circuit such as a central processing unit (CPU) or a field programmable gate array (FPGA), and a storage circuit such as a semiconductor memory. Various programs and various data are stored in the storage circuit. The processing circuit realizes various controls by executing the program and using the data as appropriate.

The transport mechanism 30 transports the medium M under the control of the control unit 20. In the example illustrated in FIG. 1, the transport mechanism 30 has a supply mechanism 31, a discharge mechanism 32, and a belt mechanism 33.

The supply mechanism 31 is a mechanism for supplying the medium M to the belt mechanism 33. In the example illustrated in FIG. 1, the supply mechanism 31 includes a first supply roller 31*a* and a second supply roller 31*b*. The first supply roller 31*a* and the second supply roller 31*b* are arranged in parallel in contact with each other, and transport the medium M sandwiched between these rollers in the Y2 direction.

The discharge mechanism 32 is a mechanism for discharging the medium M from the belt mechanism 33. In the example illustrated in FIG. 1, the discharge mechanism 32 includes a first discharge roller 32*a* and a second discharge roller 32*b*. The first discharge roller 32*a* and the second discharge roller 32*b* are arranged in parallel in contact with each other, and transport the medium M sandwiched between these rollers in the Y2 direction.

The belt mechanism 33 is a mechanism for transporting the medium M while maintaining the medium M in a predetermined posture with respect to the liquid ejecting head 40. In the example illustrated in FIG. 1, the belt mechanism 33 includes a first transport roller 33*a*, a second transport roller 33*b*, and a transport belt 33*c*. The first transport roller 33*a* and the second transport roller 33*b* are arranged in parallel at positions separated from each other in the direction along the Y axis. The transport belt 33*c* is an endless belt spanned over the first transport roller 33*a* and the second transport roller 33*b*, and is rotated by the rotation of one or both of the first transport roller 33*a* and the second transport roller 33*b*. The outer peripheral surface of the transport belt 33*c* is, for example, charged by a charging mechanism (not illustrated), and the medium M is transported in the Y2 direction with rotation of the transport belt 33*c* in a state where the transport belt 33*c* is electrostatically attracted to the outer peripheral surface.

Under the control of the control unit 20, the liquid ejecting head 40 ejects the ink from the liquid container 10 toward the medium M in the Z2 direction. The liquid ejecting head 40 has a plurality of head chips 41. Each head chip 41 has a plurality of nozzles N, a plurality of pressure chambers C, and a plurality of driving elements E. The plurality of nozzles N are provided on the ejection surface FN of the liquid ejecting head 40. In the present embodiment, the plurality of nozzles N are arranged to be distributed over the entire range of the medium M in the direction along the X axis. In other words, the liquid ejecting head 40 is a long line head in the direction along the X axis. Each of the pressure chamber C and the driving element E is provided for each nozzle N. The pressure chamber C is a space communicating with the nozzle N. The pressure chamber C is filled with ink supplied from the liquid container 10. The driving element E fluctuates the pressure of the ink in the pressure chamber C. The driving element E is, for example, a piezoelectric element that changes the volume of the pressure chamber C by deforming the wall surface of the pressure chamber C, or heat generating element that generates air bubbles in the pressure chamber C by heating ink in the pressure chamber C. In the liquid ejecting head 40, the driving element E fluctuates the pressure of the ink in the pressure chamber C, and accordingly, the ink in the pressure chamber C is ejected from the nozzle N. The relationship between the arrangement of the plurality of nozzles N and the type of ink will be described in detail later.

The support mechanism 50 is a mechanism for supporting the liquid ejecting head 40. The support mechanism 50 has a support 51. The support 51 is a member such as a frame that supports the liquid ejecting head 40, and the liquid ejecting head 40 is fixed to the support 51 by screwing or the like. The support 51 can support the liquid ejecting head 40 in a posture in which the above-mentioned ejection surface FN is inclined with respect to the horizontal plane. Hereinafter, the posture in which the ejection surface FN is inclined with respect to the horizontal plane by the support 51 is also simply referred to as "inclined posture".

In the present embodiment, the support mechanism 50 has a driving mechanism (not illustrated) that changes the position and posture of the support 51. Under the control of the control unit 20, the driving mechanism switches between a state where the ejection surface FN is parallel to the horizontal plane as illustrated by the solid line in FIG. 1 and a state where the ejection surface FN is inclined with respect to the horizontal plane as illustrated by the two-dot chain line in FIG. 1. When the ejection surface FN is parallel to the horizontal plane, printing is performed on the medium M by the liquid ejecting head 40. In a state where the ejection surface FN is inclined with respect to the horizontal plane, the maintenance mechanism 60 maintains the liquid ejecting head 40.

The position of the support 51 in a state where the ejection surface FN is inclined with respect to the horizontal plane is determined according to the position of a cap 61 described later, and is not limited to the example illustrated in FIG. 1. For example, when the cap is arranged at a position adjacent to the liquid ejecting head 40 during the printing in the direction along the X axis, the support mechanism 50 is configured such that the support 51 can be moved in the direction along the X axis. Further, the support mechanism 50 may be configured not to change the position of the support 51. In this case, after the ejection surface FN is switched from the state parallel to the horizontal plane to the inclined state, the cap 61 described later may be moved toward the support 51 such that the maintenance of the liquid ejecting head 40 can be performed by the maintenance mechanism 60.

The maintenance mechanism 60 is a mechanism used for the maintenance operation of the liquid ejecting head 40. The maintenance mechanism 60 has the cap 61, a suction pump 62, and a waste liquid flow path 63. The cap 61 is a recessed member that covers the ejection surface FN during the maintenance operation of the maintenance mechanism 60. The cap 61 caps the ejection surface FN such that a closed space having the ejection surface FN as a wall surface is formed during the maintenance operation of the maintenance mechanism 60. The suction pump 62 is a mechanism that creates a negative pressure in the space between the cap 61 and the ejection surface FN. Due to the negative pressure, a suction cleaning operation for forcibly discharging the ink inside the liquid ejecting head 40 from the plurality of nozzles N into the cap 61 is performed as a maintenance operation. The ink discharged into the cap 61 is discharged to a waste liquid container (not illustrated) via the waste liquid flow path 63 by driving the suction pump 62 in a state where the capping is released. By the above maintenance operation, the thickened ink in the liquid ejecting head 40 is discharged to the outside. Therefore, the ink in the liquid ejecting head 40 is maintained in an excellent state by the periodic maintenance operation. The maintenance mechanism 60 performs a flushing operation (idle injection operation) for forcibly ejecting ink that does not directly contribute to printing from a plurality of nozzles N into the cap 61 by driving the driving element E, as a maintenance operation. Further, the maintenance mechanism 60 may perform the pressure cleaning operation for discharging the ink from the nozzle N by pressurizing the flow path upstream of the pressure chamber C of the liquid ejecting head 40 by the operation of a pump or the like that pressurizes the ink supplied from the liquid container 10 to the liquid ejecting head 40.

1-2. Ink

Hereinafter, the first ink, the second ink, the third ink, and the fourth ink will be described. In the following, each of the first ink, the second ink, the third ink, and the fourth ink is also simply referred to as ink.

The ink contains water, a coloring material, and a moisturizer. The ink may be a dispersion liquid or a solution. In addition, one of the first ink, the second ink, the third ink, and the fourth ink may not contain a moisturizer as long as the relationship of thickening resistance as described later can be obtained.

The coloring material is a pigment or dye. The pigment is not particularly limited, and examples thereof include black pigments such as carbon black; cyan pigments such as C.I. Pigment Blue 1, 2, 3, 15:3, 15:4, 15:34, 16, 22, and 60, and C.I. Vat Blue 4 and 60; magenta pigments such as C.I. Pigment Red 5, 7, 12, 48 (Ca), 48 (Mn), 57 (Ca), 57:1, 112, 122, 123, 168, 184, and 202, and C.I. Pigment Violet 19; yellow pigments such as C.I. Pigment Yellow 1, 2, 3, 12, 13, 14C, 16, 17, 73, 74, 75, 83, 93, 95, 97, 98, 110, 114, 119, 128, 129, 138, 150, 151, 154, 155, 180, and 185; orange pigments such as C.I. Pigment Orange 36 and 43; and green pigments such as C.I. Pigment Green 7 and 36. Of these, one can be used alone or in combination of two or more.

The dye is not particularly limited, and examples thereof include C.I. Disperse Yellow 3, 7, 8, 23, 39, 51, 54, 60, 71, and 86; C.I. Disperse Orange 1, 1:1, 5, 20, 25, 25:1, 33, 56, and 76; C.I. Disperse Brown 2; C.I. Disperse Red 11, 50, 53, 55, 55:1, 59, 60, 65, 70, 75, 93, 146, 158, 190, 190:1, 207, 239, and 240; C.I. Vat Red 41; C.I. Disperse Violet 8, 17, 23, 27, 28, 29, 36, and 57; C.I. Disperse Blue 19, 26, 26:1, 35, 55, 56, 58, 64, 64:1, 72, 72:1, 81, 81:1, 91, 95, 108, 131, 141, 145, and 359; and C.I. Solvent Blue 36, 63, 105, and 111. Of these, one can be used alone or in combination of two or more.

A moisturizer is a material having a moisture absorption rate of 100% or more. The moisture absorption rate is defined by (moisture absorption rate)=(mass of moisturizer after being left−mass of initial moisturizer)/(mass of initial moisturizer). For the measurement of the moisture absorption rate, for example, a 4 g measurement target in a 50 ml glass screw bottle is placed in a constant temperature bath (FX430N manufactured by ETAC) in a high humidity environment (40° C., 97% RH) and the measurement of the moisture absorption rate is performed by measuring the mass of the measurement target until the time when the change in the mass disappears using an electronic balance (GF600 manufactured by A&D Company). Here, the mass of the measurement target at the start of measurement is the "mass of initial moisturizer", and the mass of the measurement target at the end of the measurement is the "mass of the moisturizer after being left". Further, the temperature and humidity are measured by using, for example, a thermo-hygrometer (TR-72U manufactured by T&D).

The moisturizer is not particularly limited, and examples thereof include glycerin, 2-pyrrolidone, urea, triethanolamine, propylene glycol, 1-(2-hydroxyethyl)-2-pyrrolidone, trimethylolpropane, triethylene glycol, 1,5-petandiol, triethylene glycol monomethyl ether, and amino coat. Of these, one can be used alone or in combination of two or more. Among these, from the viewpoint of high moisture absorption rate, it is preferable to use glycerin, 2-pyrrolidone, triethanolamine, propylene glycol, 1-(2-hydroxyethyl)-2-pyrrolidone, and trimethylolpropane, as the moisturizer.

In the above-mentioned measuring method, the moisture absorption rate of glycerin is 246%. The moisture absorption rate of 2-pyrrolidone is 199%. The moisture absorption rate of urea is 316%. The moisture absorption rate of triethanolamine is 150%. The moisture absorption rate of propylene glycol is 168%, and the moisture absorption rate of 1-(2-hydroxyethyl)-2-pyrrolidone is 159%. The moisture absorption rate of trimethylolpropane is 111%.

The ink may contain a resin, a surfactant, a dispersion stabilizer, and other additives, in addition to water, a coloring material, and a moisturizer.

The first ink, the second ink, the third ink, and the fourth ink containing the above components have different thickening resistances from each other. Specifically, the thickening resistances of these inks are in the order of the first ink, the third ink, the fourth ink, and the second ink from the lowest to the highest. The "thickening resistance" is a property that makes it difficult to thicken, and is defined by, for example, the rate of increase in viscosity when being left for 24 hours in an environment of room temperature (25° C.) and humidity of 20%, and the lower the rate of increase of ink, the higher the thickening resistance. The environmental temperature, environmental humidity, and leaving time when the ink is left to measure the thickening resistance are not limited thereto.

It is preferable that the effective water content of the second ink be smaller than the effective water content of the first ink. In this case, the thickening resistance of the second ink can be made higher than the thickening resistance of the first ink. From the same viewpoint, it is preferable that the effective water content of the third ink be larger than the effective water content of the second ink and smaller than the effective water content of the first ink. In addition, it is preferable that the effective water content of the fourth ink be larger than the effective water content of the second ink and smaller than the effective water content of the third ink. As described above, it is preferable that the effective water content of these inks be in the order of the second ink, the fourth ink, the third ink, and the first ink from the smallest to the largest.

The "effective water content" is calculated using the following equation.

(effective water content [wt %])=(water content [wt %])−{(moisture absorption rate of moisturizer)×(content of moisturizer [wt %])}

Here, when the moisturizer is a mixture of two or more types of moisturizers, the "moisture absorption rate of moisturizer" in the above equation is the moisture absorption rate of the mixture, and is measured by, for example, the above-mentioned measuring method. Further, when a mixture of n types of moisturizer [1] to moisturizer [n](n is a natural number of 2 or more) is used, the approximate effective water content may be calculated by using the following equation.

(effective water content [wt %])=(water content [wt %])−{(moisture absorption rate of moisturizer [1])×(content [wt %] of moisturizer [1])}−{(moisture absorption rate of moisturizer [*n*])×(content [wt %] of moisturizer [*n*])}

Further, from the viewpoint of effectively reducing the thickening of the second ink, the effective water content of the first ink is preferably two times or more, and is more preferably three times or more the effective water content of the second ink.

Further, it is preferable that the hygroscopicity of the second ink be higher than the hygroscopicity of the first ink. In this case, the thickening resistance of the second ink can be made higher than the thickening resistance of the first ink. From the same viewpoint, it is preferable that the hygroscopicity of the third ink be higher than the hygroscopicity of the first ink and lower than the hygroscopicity of the second ink. Further, it is preferable that the hygroscopicity of the fourth ink be higher than the hygroscopicity of the third ink and lower than the hygroscopicity of the second ink. As described above, it is preferable that the hygroscopicity of these inks be in the order of the second ink, the fourth ink, the third ink, and the first ink from the highest to the lowest.

The "hygroscopicity" is a property that easily retains water, and is defined by the product of the moisture absorption rate of the moisturizer and the content of the moisturizer in the ink, and the larger the value of the product, the higher the hygroscopicity. When the ink contains a plurality of types of moisturizers, the "hygroscopicity" is defined by the product of the moisture absorption rate of the mixture of the plurality of types of moisturizers and the content of the mixture in the ink. Further, when a mixture of n types (n is a natural number of 2 or more) of moisturizer [1] to moisturizer [n] is used, the approximate hygroscopicity is defined by {(moisture absorption rate of moisturizer [1])×(content rate [wt %] of moisturizer [1])}−{(moisture absorption rate of moisturizer [n])×(content rate [wt %] of moisturizer [n])}.

1-3. Liquid Ejecting Head

Figure 2:
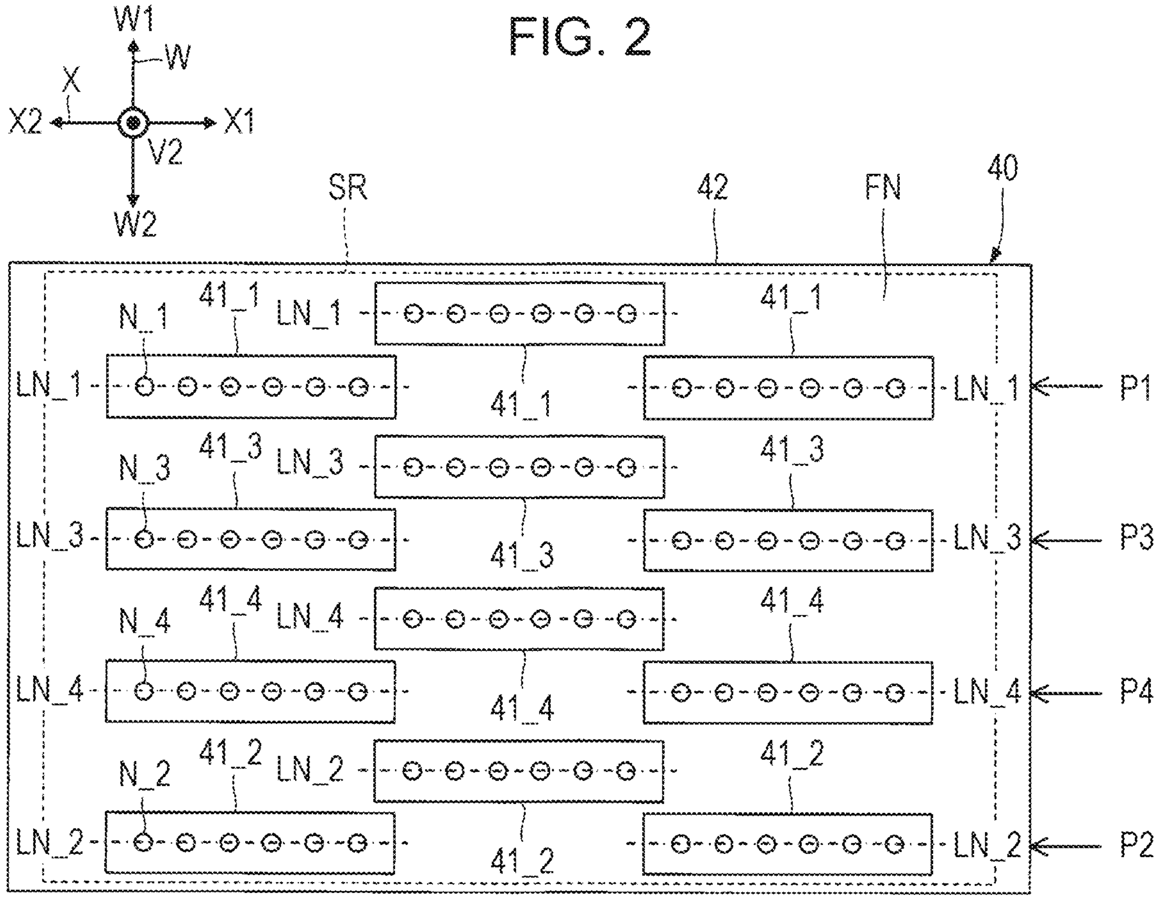
FIG. 2 is a plan view of a liquid ejecting head of the first embodiment.

FIG. 2 is a plan view of the liquid ejecting head 40 of the first embodiment. FIG. 2 schematically illustrates the liquid ejecting head 40 when the ejection surface FN is viewed in a plan view when the liquid ejecting head 40 is in an inclined posture, that is, at the time of capping. As the head chip 41, as illustrated in FIG. 2, the liquid ejecting head 40 has three head chips 41_1, three head chips 41_2, three head chips 41_3, and three head chips 41_4. Here, these sets are arranged in the W2 direction in the order of the set of three head chips 41_1, the set of three head chips 41_3, the set of three head chips 41_4, and the set of three head chips 41_2. The number of head chips 41 included in one set of head chips 41 may be two or four or more. Further, the number of head chips 41_1 included in the liquid ejecting head 40 may be one, and the same applies to the head chips 42_2 to 42_4.

Although not illustrated, the head chip 41 includes a nozzle plate in which the plurality of nozzles N are formed. The ejection surface FN is a surface including the surface of the nozzle plate. When the surface of the member constituting the liquid ejecting head 40 other than the nozzle plate is substantially continuous with the surface of the nozzle plate, in addition to the surface of the nozzle plate, the ejection surface FN may include a surface of a member constituting the liquid ejecting head 40 other than the nozzle plate. Here, "substantially continuous" means that, even when a small gap or step is included between the surface of the nozzle plate and the surface of a member constituting the liquid ejecting head 40 other than the nozzle plate, these may be regarded as a continuous surface.

The three head chips 41_1 are arranged in a direction along the X axis. However, of the three head chips 41_1, the two head chips 41_1 positioned at both ends in the direction along the X axis are arranged side by side on the same straight line along the X axis, but the remaining one head chip 41_1 is positioned in the W1 direction with respect to the two head chips 41_1. Each head chip 41_1 has a nozzle row LN_1 composed of a plurality of nozzles N_1 arranged in a direction along the X axis. The nozzle N_1 is a nozzle N for ejecting the first ink.

The three head chips 41_2 are arranged in the direction along the X axis. However, of the three head chips 41_2, the two head chips 41_2 positioned at both ends in the direction along the X axis are arranged side by side on the same straight line along the X axis, but the remaining one head chip 41_2 is positioned in the W1 direction with respect to the two head chips 41_2. Each head chip 41_2 has a nozzle row LN_2 composed of a plurality of nozzles N_2 arranged in a direction along the X axis. The nozzle N_2 is a nozzle N for ejecting the second ink.

The three head chips 41_3 are arranged in the direction along the X axis. However, of the three head chips 41_3, the two head chips 41_3 positioned at both ends in the direction along the X axis are arranged side by side on the same straight line along the X axis, but the remaining one head chip 41_3 is positioned in the W1 direction with respect to the two head chips 41_3. Each head chip 41_3 has a nozzle row LN_3 composed of a plurality of nozzles N_3 arranged in a direction along the X axis. The nozzle N_3 is a nozzle N for ejecting the third ink.

The three head chips 41_4 are arranged in the direction along the X axis. However, of the three head chips 41_4, the two head chips 41_4 positioned at both ends in the direction along the X axis are arranged side by side on the same straight line along the X axis, but the remaining one head chip 41_4 is positioned in the W1 direction with respect to the two head chips 41_4. Each head chip 41_4 has a nozzle row LN_4 composed of a plurality of nozzles N_4 arranged in a direction along the X axis. The nozzle N_4 is a nozzle N for ejecting the fourth ink.

As illustrated in FIG. 2, the liquid ejecting head 40 described above has three sets in which the head chip 41_1, the head chip 41_3, the head chip 41_4, and the head chip 41_2 are arranged in this order in the W2 direction. In the following, the nozzle row LN_1, LN_2, LN_3, and LN_4 may be referred to as the nozzle row LN without distinguishing the nozzle rows.

Figure 3:
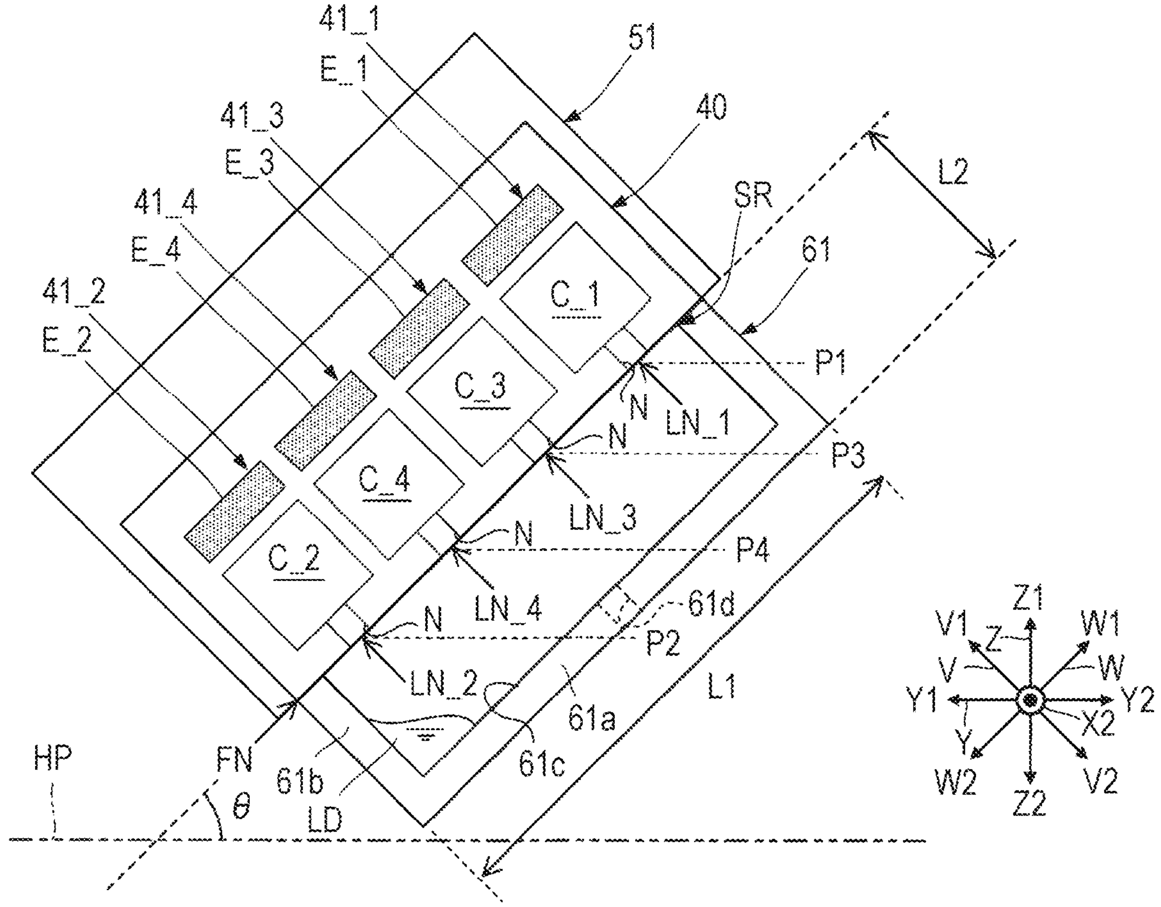
FIG. 3 is a view schematically illustrating the liquid ejecting head at the time of capping.

FIG. 3 is a view schematically illustrating the liquid ejecting head 40 at the time of capping. As illustrated in FIG. 3, at the time of capping, the ejection surface FN is covered with the cap 61 in a state of being inclined at an angle θ with respect to a horizontal plane HP.

The cap 61 has a recessed shape and forms a closed space with the ejection surface FN. More specifically, the cap 61 has a bottom wall 61*a* and a side wall 61*b* extending from the outer periphery of the bottom wall 61*a* over the entire area. The bottom wall 61*a* and the side wall 61*b* form a recess portion 61*c*. The bottom wall 61*a* is formed with a discharge port 61*d* that communicates with the waste liquid flow path 63. The cap 61 forms a closed space surrounded by the bottom wall 61*a*, the side wall 61*b*, and the ejection surface FN. In other words, a closed space is formed by closing the opening of the recess portion 61*c* with the ejection surface FN. Strictly speaking, the plurality of nozzles N and the discharge port 61*d* are open in this closed space. Specifically, a nozzle N1 of the nozzle row LN_1, a nozzle N2 of the nozzle row LN_2, a nozzle N3 of the nozzle row LN_3, and a nozzle N4 of the nozzle row LN_4 are open toward the recess portion 61*c*. At the time of capping, when the opening of the recess portion 61*c* of the cap 61 faces the plurality of nozzles N when viewed in the direction along the V axis, a gap may be formed between the side wall 61*b* and the liquid ejecting head 40. In other words, the closed space may not be formed by opening the recess portion 61*c* at the time of capping to the atmosphere.

A length L1 of the cap 61 in the direction along the W axis is larger than a length L2 of the cap 61 in the direction along the V axis. Therefore, the cap 61 can be downsized as compared with the configuration in which the length L2 is larger than the length L1. Further, in the configuration in which the length L1 is larger than the length L2, the ejection surface FN is more easily affected by a hygroscopic liquid LD unevenly distributed in the cap 61 (described later) than in the configuration in which the length L2 is larger than the length L1. Therefore, in a configuration in which the length L1 is larger than the length L2, the effect of the order of thickening resistance of the ink (described later) is remarkably obtained.

In the example illustrated in FIG. 3, the bottom wall 61*a* has a plate shape extending in a direction orthogonal to the V axis, that is, in a direction parallel to the ejection surface FN. Here, the bottom surface of the bottom wall 61*a* is inclined with respect to the horizontal plane HP along the ejection surface FN at the time of capping. The side wall 61*b* extends from the outer periphery of the bottom wall 61*a* over the entire periphery in the V1 direction, that is, in the direction opposite to the normal vector of the ejection surface FN. As illustrated in FIGS. 2 and 3, during capping, the top portion of the side wall 61*b* comes into contact with a seal region SR of the ejection surface FN, and accordingly, the opening of the recess portion 61*c* is closed by the ejection surface FN of the liquid ejecting head 40. In addition, the opening of the recess portion 61*c* may be closed by the liquid ejecting head 40 as the liquid ejecting head 40 comes into contact with a part close to the outer peripheral edge of the ejection surface FN.

The hygroscopic liquid LD is arranged in the recess portion 61*c*. The hygroscopic liquid LD is, for example, ink ejected from the liquid ejecting head 40 into the recess portion 61*c* by a flushing operation. The ink accumulates in the lower portion of the recess portion 61*c* due to gravity along the inclination of the bottom wall 61*a* described above. In addition, the moisture in the ink gradually evaporates over time except during capping. Therefore, the hygroscopic liquid LD has a lower water content than the content of ink in the liquid ejecting head 40. In other words, the hygroscopic liquid LD has a higher content of moisturizer than the ink in the liquid ejecting head 40. Therefore, the hygroscopicity of the hygroscopic liquid LD is higher than the hygroscopicity of the ink in the liquid ejecting head 40. In addition, the hygroscopic liquid LD may be a liquid containing a moisturizer having a moisturizing property such as glycerin, which is arranged separately from the ink from the liquid ejecting head 40. Further, the hygroscopic liquid LD may be ink discharged by a pressure cleaning operation or a suction cleaning operation.

At the time of capping, the positions of each nozzle row LN of the liquid ejecting head 40 in the vertical direction are in the order of nozzle rows LN_2, LN_4, LN_3, and LN_1 from the bottom to the top. In other words, at the time of capping, a position P3 of the nozzle row LN_3 in the vertical direction is lower than a position P1 of the nozzle row LN_1, a position P4 of the nozzle row LN_4 in the vertical direction is lower than the position P3 of the nozzle row LN_3, and a position P2 of the nozzle row LN_2 in the vertical direction is lower than the position P4 of the nozzle row LN_4. In addition, the position of the nozzle row LN is the position of the nozzle N positioned at the lowest position in the vertical direction among the plurality of nozzles N included in the nozzle row LN.

Further, as illustrated in FIGS. 2 and 3, when the liquid ejecting head 40 is in an inclined posture, the nozzle rows LN_1 are arranged in the W1 direction at intervals with respect to the nozzle rows LN_3, the nozzle rows LN_3 are arranged in the W1 direction at intervals with respect to the nozzle rows LN_4, and the nozzle rows LN_4 are arranged in the W1 direction at intervals with respect to the nozzle rows LN_2, when viewed in the direction along the intersection line between the ejection surface FN and the horizontal plane HP.

Therefore, at the time of capping, the distance between each nozzle row LN of the liquid ejecting head 40 and the above-mentioned hygroscopic liquid LD is in the order of the nozzle rows LN_2, LN_4, LN_3, and LN_1 from the nearest to the farthest. As a result, the influence of the moisture absorption by the hygroscopic liquid LD to each nozzle row of the liquid ejecting head 40 is larger in the order of the nozzle rows LN_2, LN_4, LN_3, and LN_1. Therefore, when the ink thickening resistances of all of the nozzle rows of the liquid ejecting head 40 are equal to each other, the difference in thickening of ink between the nozzle rows becomes large.

Here, as described above, the thickening resistance of the ink of the liquid ejecting head 40 is in the order of the first ink, the third ink, the fourth ink, and the second ink from the lowest to the highest. Therefore, the difference in thickening of ink between the nozzle rows can be reduced. As a result, the discharge amount of ink ejected from the plurality of nozzle rows of the liquid ejecting head 40 can be made equal to each other during the flushing operation performed after the capping is released in order to discharge the ink in the nozzle N thickened during capping. Therefore, in consideration of the difference in thickening between the nozzle rows, it is possible to save the trouble of changing the discharge amount of ink ejected from each of the plurality of nozzle rows of the liquid ejecting head 40 for each nozzle row. Incidentally, for example, when the first ink having the lowest thickening resistance is ejected from the nozzle row LN_2 arranged at the lowest position in the vertical direction, and the second ink having the highest thickening resistance is ejected from the nozzle row LN_1 arranged at the highest position in the vertical direction, the degree of thickening of the first ink in the nozzle N_2 of the nozzle row LN_2 is higher than the degree of thickening of the second ink in the nozzle N_1 of the nozzle row LN_1. Therefore, when a large amount of ink is discharged from each of the nozzle rows LN_1 and LN_2 by the flushing operation in accordance with the degree of thickening of the first ink in the nozzle N_2 of the nozzle row LN_2, there is a risk of excessive discharge until normal ink that has not thickened is discharged from the nozzle row LN_1 having a low degree of thickening. On the other hand, as described above, the thickening resistance of the ink of the liquid ejecting head 40 is in the order of the first ink, the third ink, the fourth ink, and the second ink from the lowest to the highest, and thus the difference in thickening of ink is small between the nozzle rows. Accordingly, even when the same amount of ink is discharged from each of the nozzle rows LN_1 to LN_4 by the flushing operation, normal ink is not excessively discharged, and as a result, waste of ink is reduced.

As described above, the above liquid ejecting apparatus 100 includes the liquid ejecting head 40 and the support 51. The liquid ejecting head 40 has the ejection surface FN including the nozzle row LN_1 which is an example of the "first nozzle row" for ejecting the first ink, and the nozzle row LN_2 which is an example of the "second nozzle row" for ejecting the second ink. The support 51 can support the liquid ejecting head 40 in an inclined posture in which the ejection surface FN is inclined with respect to the horizontal plane HP.

Here, in a state where the support 51 supports the liquid ejecting head 40 in the inclined posture, the nozzle row LN_1 is positioned above the nozzle row LN_2 in the vertical direction. Moreover, the thickening resistance of the second ink is higher than the thickening resistance of the first ink.

In the above liquid ejecting apparatus 100, when an object having hygroscopicity for the first ink and the second ink is present below the ejection surface FN in the vertical direction, the distance between the object and the nozzle row LN_2 is shorter than the distance between the object and the nozzle row LN_1. Therefore, the nozzle row LN_2 is more strongly affected by the moisture absorption by the object than the nozzle row LN_1. In the liquid ejecting apparatus 100, since the thickening resistance of the second ink is higher than the thickening resistance of the first ink, it is possible to reduce the thickening of the second ink by the object. Therefore, the difference between the thickening of the first ink and the thickening of the second ink can be reduced. As a result, it is possible to reduce waste of ink and reduce deterioration of image quality due to thickening. The object is a hygroscopic liquid LD in the present embodiment, but is not limited thereto, and may be, for example, the medium M or the like.

As described above, the liquid ejecting apparatus 100 further includes a recessed cap 61 that covers the ejection surface FN in a state where the support 51 supports the liquid ejecting head 40 in an inclined posture. In addition, one or both of the first ink and the second ink contain a moisturizer. Here, "the cap 61 covers the ejection surface FN" means that the recess portion 61*c* of the cap 61 may face the plurality of nozzles N provided on the ejection surface FN at least when the ejection surface FN is viewed in the normal direction, and a gap may be formed between the side wall 61*b* and the liquid ejecting head 40 at the time of capping.

Inside the cap 61, the ink ejected from the liquid ejecting head 40 by flushing or the like remains as a hygroscopic liquid which is an example of an object having hygroscopicity to the first ink and the second ink. Here, the cap 61 is inclined with respect to the horizontal plane HP along the ejection surface FN. Therefore, since the hygroscopic liquid is unevenly distributed in the lower portion of the cap 61, the hygroscopic liquid is positioned below the ejection surface FN in the vertical direction. As a result, the nozzle row LN_2 is more strongly affected by the moisture absorption of the hygroscopic liquid than the nozzle row LN_1. Therefore, by making the thickening resistance of the second ink higher than the thickening resistance of the first ink, the difference between the thickening of the first ink and the thickening of the second ink can be reduced.

In the present embodiment, as described above, the support 51 can change the angle formed by the ejection surface FN and the horizontal plane HP. Here, an angle $\theta 0$ formed by the ejection surface FN and the horizontal plane HP during the recording operation with respect to the medium M is smaller than the angle $\theta$ formed by the ejection surface FN and the horizontal plane HP in the inclined posture. Therefore, the recording operation for the medium M can be stably performed, and as a result, the image quality can be improved. Further, the angle $\theta$ formed by the ejection surface FN and the horizontal plane HP in the inclined posture can be increased. As a result, it is possible to efficiently perform a wiping operation of wiping the ink adhering to the ejection surface FN with a wiping member (not illustrated), and to efficiently discharge air bubbles in the liquid ejecting head 40 by a maintenance operation.

In addition, as described above, the cap 61 has the bottom wall 61*a* and the side wall 61*b* extending from the outer periphery of the bottom wall 61*a* over the entire area. In addition, the cap 61 forms a closed space which is surrounded by the bottom wall 61*a*, the side wall 61*b*, and the ejection surface FN, and in which the plurality of nozzles N_1 constituting the nozzle row LN_1 and the plurality of nozzles N_2 constituting the nozzle row LN_2 are open. Therefore, the humidity inside the cap 61 can be increased as compared with the configuration in which the space between the cap 61 and the ejection surface FN is open. As a result, the thickening of each of the first ink and the second ink can be reduced.

Further, as described above, the ejection surface FN further has LN_3, which is an example of the "third nozzle row" for ejecting the third ink. The nozzle row LN_3 is positioned between the nozzle row LN_1 and the nozzle row LN_2 in the vertical direction in a state where the support 51 supports the liquid ejecting head 40 in an inclined posture. The thickening resistance of the third ink is higher than the thickening resistance of the first ink and lower than the thickening resistance of the second ink. Therefore, the difference between the thickening of the first ink or the second ink and the thickening of the third ink can be reduced.

Furthermore, as described above, the ejection surface FN further has the nozzle row LN_4, which is an example of the "fourth nozzle row" for ejecting the fourth ink. The nozzle row LN_4 is positioned between the nozzle row LN_2 and the nozzle row LN_3 in the vertical direction in a state where the support 51 supports the liquid ejecting head 40 in an inclined posture. The thickening resistance of the fourth ink is lower than the thickening resistance of the second ink and higher than the thickening resistance of the third ink. Therefore, the difference between the thickening of the first ink, the second ink, or the third ink and the thickening of the fourth ink can be reduced.

Further, as described above, in a state where the support 51 supports the liquid ejecting head 40 in an inclined posture, the arrangement directions of each of the nozzle row LN_1 and the nozzle row LN_2 intersect the W1 direction or the W2 direction orthogonal to the X1 direction or the X2 direction along the ejection surface FN. In addition, the X1 direction or the X2 direction is an example of the "first direction" and is a direction along the intersection line between the ejection surface FN and the horizontal plane HP. The W1 direction or the W2 direction is an example of the "second direction".

Furthermore, as described above, it is preferable that the discharge amount of the first ink ejected from the nozzle row LN_1 during the flushing operation be equal to the discharge amount of the second ink ejected from the nozzle row LN_2. Therefore, waste of ink can be reduced. Here, "equal" means not only the case of being exactly equal but also the case of having a difference of 10% or less.

2. Second Embodiment

Hereinafter, a second embodiment of the present disclosure will be described. In the embodiment illustrated below, elements having the same effects and functions as those of the first embodiment will be given the reference numerals used in the description of the first embodiment, and each of the detailed descriptions thereof will be appropriately omitted.

Figure 4:
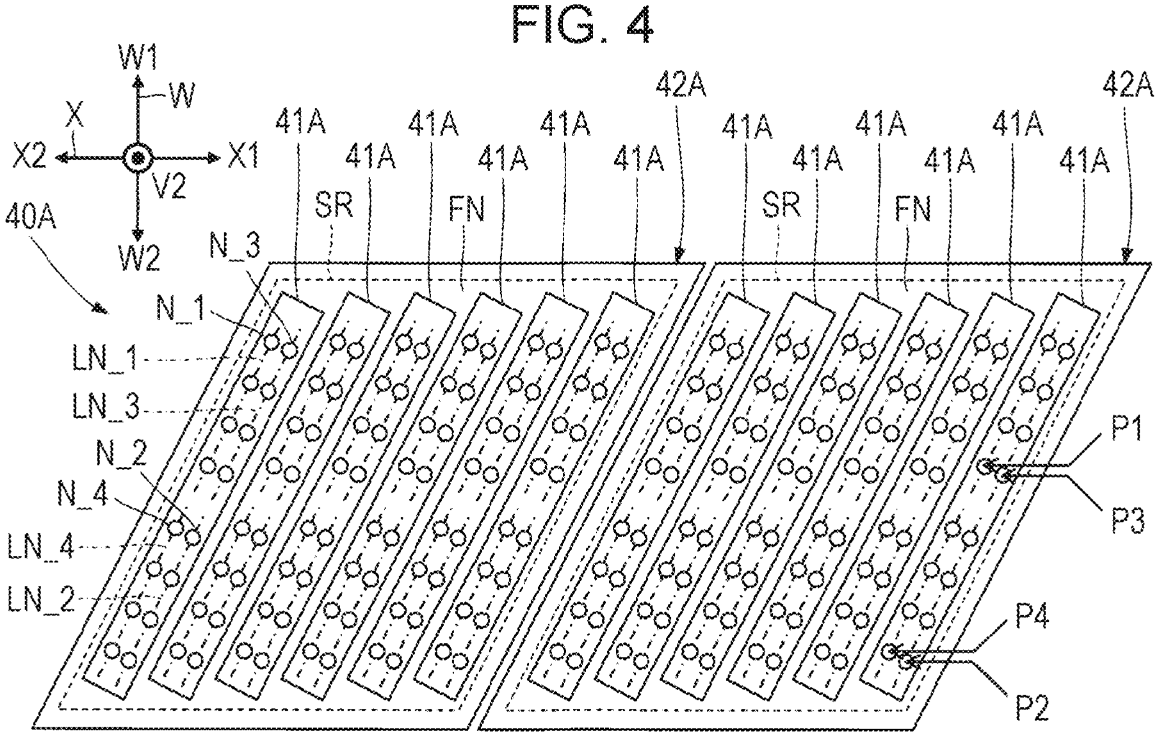
FIG. 4 is a plan view of a liquid ejecting head of a second embodiment.

FIG. 4 is a plan view of a liquid ejecting head 40A of the second embodiment. FIG. 4 schematically illustrates the liquid ejecting head 40A when the ejection surface FN is viewed in a plan view at the time of capping, that is, when the liquid ejecting head 40A is in an inclined posture. The present embodiment is substantially the same as the above-described first embodiment except that the liquid ejecting head 40A is provided instead of the liquid ejecting head 40.

The liquid ejecting head 40A is composed of a plurality of heads 42A arranged side by side along the X axis. The liquid ejecting head 40A of the present embodiment is composed of two heads 42A, but the number of heads 42A included in the liquid ejecting head 40A may be one or three or more. The plurality of heads 42A may be integrated. In other words, the liquid ejecting head 40A may be composed of one head in which a plurality of heads 42A are integrated.

Each head 42A has six head chips 41A aligned in the direction along the X axis. The number of head chips 41A included in the head 42A may be five or less, or seven or more. Further, at least two of the six head chips 41A may be integrated.

Each head chip 41A has nozzle rows LN_1, LN_2, LN_3, and LN_4 extending in a direction inclined with respect to the W axis. The nozzle row LN_1 is composed of a plurality of nozzles N_1 arranged in a direction inclined with respect to the W axis. The nozzle N_1 is the nozzle N for ejecting the first ink. The nozzle row LN_2 is composed of a plurality of nozzles N_2 arranged in a direction inclined with respect to the W axis. The nozzle N_2 is a nozzle N for ejecting the second ink. The nozzle row LN_3 is composed of a plurality of nozzles N_3 arranged in a direction inclined with respect to the W axis. The nozzle N_3 is the nozzle N for ejecting the third ink. The nozzle row LN_4 is composed of a plurality of nozzles N_4 arranged in a direction inclined with respect to the W axis. The nozzle N_4 is a nozzle N for ejecting the fourth ink.

Here, the nozzle row LN_1 and the nozzle row LN_4 are aligned on the same straight line along a direction inclined with respect to the W axis, and the nozzle row LN_1 is positioned in the W1 direction with respect to the nozzle row LN_4. The nozzle row LN_2 and the nozzle row LN_3 are aligned on the same straight line along a direction inclined with respect to the W axis at the position in the X1 direction with respect to the nozzle row LN_1 and the nozzle row LN_4, and the nozzle row LN_3 is positioned in the W1 direction with respect to the nozzle row LN_2.

The cap 61 (not illustrated) is provided for each head 42A, and the side wall 61*b* of the cap 61 comes into contact with the seal region SR corresponding to each head 42A illustrated in FIG. 4. The seal region SR and the side wall 61*b* of the cap 61 may not be in contact with each other.

At the time of capping, the positions of each nozzle row LN of the liquid ejecting head 40A in the vertical direction are in the order of nozzle rows LN_2, LN_4, LN_3, and LN_1 from the bottom to the top. In other words, at the time of capping, the position P3 of the nozzle row LN_3 in the vertical direction is lower than the position P1 of the nozzle row LN_1, the position P4 of the nozzle row LN_4 in the vertical direction is lower than the position P3 of the nozzle row LN_3, and the position P2 of the nozzle row LN_2 in the vertical direction is lower than the position P4 of the nozzle row LN_4.

Also in the above-described second embodiment, the difference between the thickening of the first ink and the thickening of the second ink can be reduced as in the above-described first embodiment. In the present embodiment, in a state where the support 51 supports the liquid ejecting head 40A in an inclined posture, a part of one of the nozzle row LN_1 and the nozzle row LN_2 overlap at least a part of the other one when viewed in the direction along the intersection line between the ejection surface FN and the horizontal plane HP. Here, as described above, the position of the nozzle row LN is the position of the nozzle N positioned at the lowest position in the vertical direction among the plurality of nozzles N included in the nozzle row LN. Therefore, for example, the nozzle N_1 positioned at the lowest position in the vertical direction among the plurality of nozzles N_1 of the nozzle row LN_1 is positioned in the vertical direction above the nozzle N_2 positioned at the lowest position in the vertical direction among the plurality of nozzles N_2 of the nozzle row LN_2. In other words, the position P1 of the nozzle N_1 positioned at the lowest position is positioned above the position P2 of the nozzle N_2 positioned at the lowest position in the vertical direction.

3. Third Embodiment

Hereinafter, a third embodiment of the present disclosure will be described. In the embodiment illustrated below, elements having the same effects and functions as those of the first embodiment will be given the reference numerals used in the description of the first embodiment, and each of the detailed descriptions thereof will be appropriately omitted.

Figure 5:
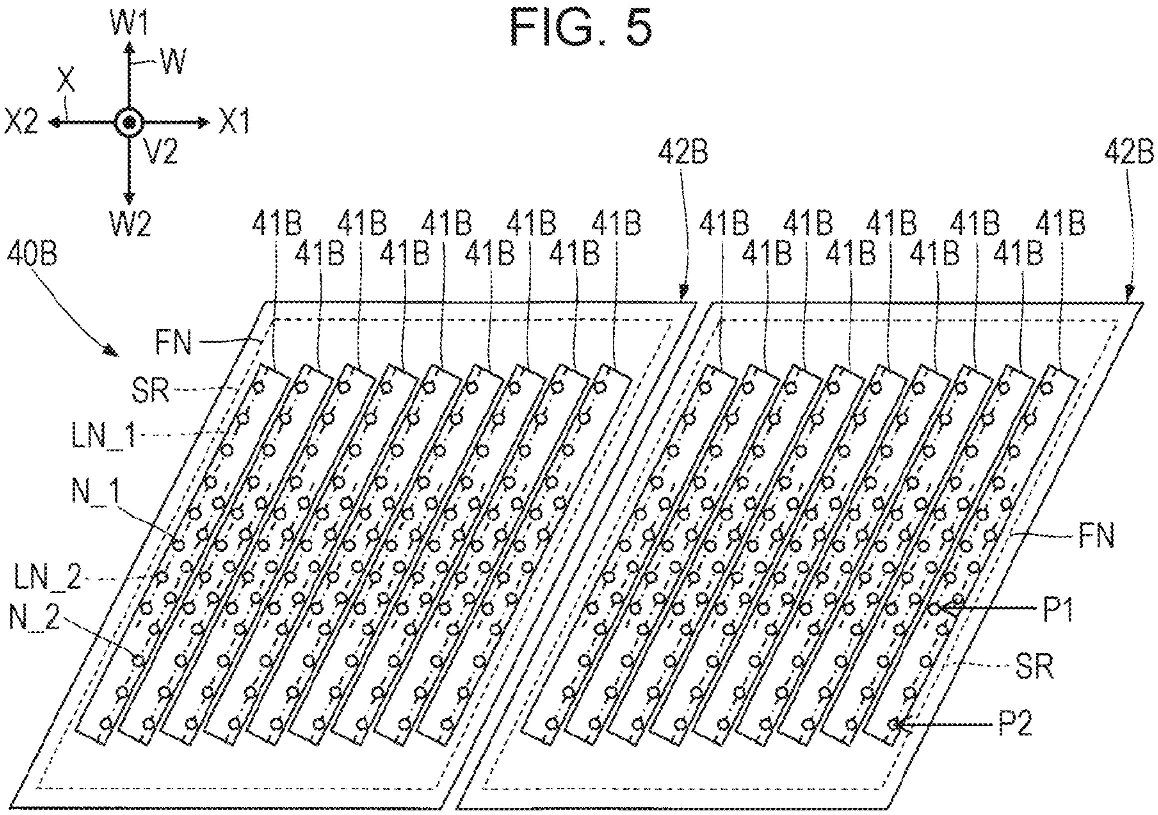
FIG. 5 is a plan view of a liquid ejecting head of a third embodiment.

FIG. 5 is a plan view of a liquid ejecting head 40B of the third embodiment. FIG. 5 schematically illustrates the liquid ejecting head 40B when the ejection surface FN is viewed in a plan view at the time of capping, that is, when the liquid ejecting head 40B is in an inclined posture. The present embodiment is substantially the same as the above-described first embodiment except that the liquid ejecting head 40B is provided instead of the liquid ejecting head 40.

The liquid ejecting head 40B is composed of a plurality of heads 42B arranged side by side along the X axis. The liquid ejecting head 40B of the present embodiment is composed of two heads 42B, but the number of heads 42B included in the liquid ejecting head 40B may be one or three or more. The plurality of heads 42B may be integrated. In other words, the liquid ejecting head 40B may be composed of one head in which a plurality of heads 42B are integrated.

Each head 42B has nine head chips 41B aligned in the direction along the X axis. The number of head chips 41B included in the head 42B may be eight or less, or ten or more. Further, at least two of the nine head chips 41B may be integrated.

Each head chip 41B has nozzle rows LN_1 and LN_2 extending in a direction inclined with respect to the W axis. The nozzle row LN_1 is composed of the nozzles N_1 arranged in the direction inclined with respect to the W axis. The nozzle row LN_1 ejects the first ink. The nozzle N_1 is the nozzle N for ejecting the first ink. The nozzle row LN_2 is composed of the nozzles N_2 arranged in the direction inclined with respect to the W axis. The nozzle row LN_2 ejects the second ink.

Here, the nozzle row LN_1 and the nozzle row LN_2 are arranged to be offset from each other in both the arrangement direction of the nozzles N and the direction orthogonal to the arrangement direction. In other words, in a state where the support 51 supports the liquid ejecting head 40B in an inclined posture, a part of one of the nozzle row LN_1 and the nozzle row LN_2 overlap at least a part of the other one when viewed in the direction along the intersection line between the ejection surface FN and the horizontal plane HP. In addition, the nozzle N_1 positioned at the lowest position in the vertical direction among the plurality of nozzles N_1 of the nozzle row LN_1 is positioned in the vertical direction above the nozzle N_2 positioned at the lowest position in the vertical direction among the plurality of nozzles N_2 of the nozzle row LN_2. In other words, the position P1 of the nozzle N_1 positioned at the lowest position is positioned above the position P2 of the nozzle N_2 positioned at the lowest position in the vertical direction.

The cap 61 (not illustrated) is provided for each head 42B, and the side wall 61*b* of the cap 61 comes into contact with the seal region SR corresponding to each head 42B illustrated in FIG. 5. The seal region SR and the side wall 61*b* of the cap 61 may not be in contact with each other.

Also in the above-described third embodiment, the difference between the thickening of the first ink and the thickening of the second ink can be reduced as in the above-described first embodiment.

4. Fourth Embodiment

Hereinafter, a fourth embodiment of the present disclosure will be described. In the embodiment illustrated below, elements having the same effects and functions as those of the first embodiment will be given the reference numerals used in the description of the first embodiment, and each of the detailed descriptions thereof will be appropriately omitted.

Figure 6:
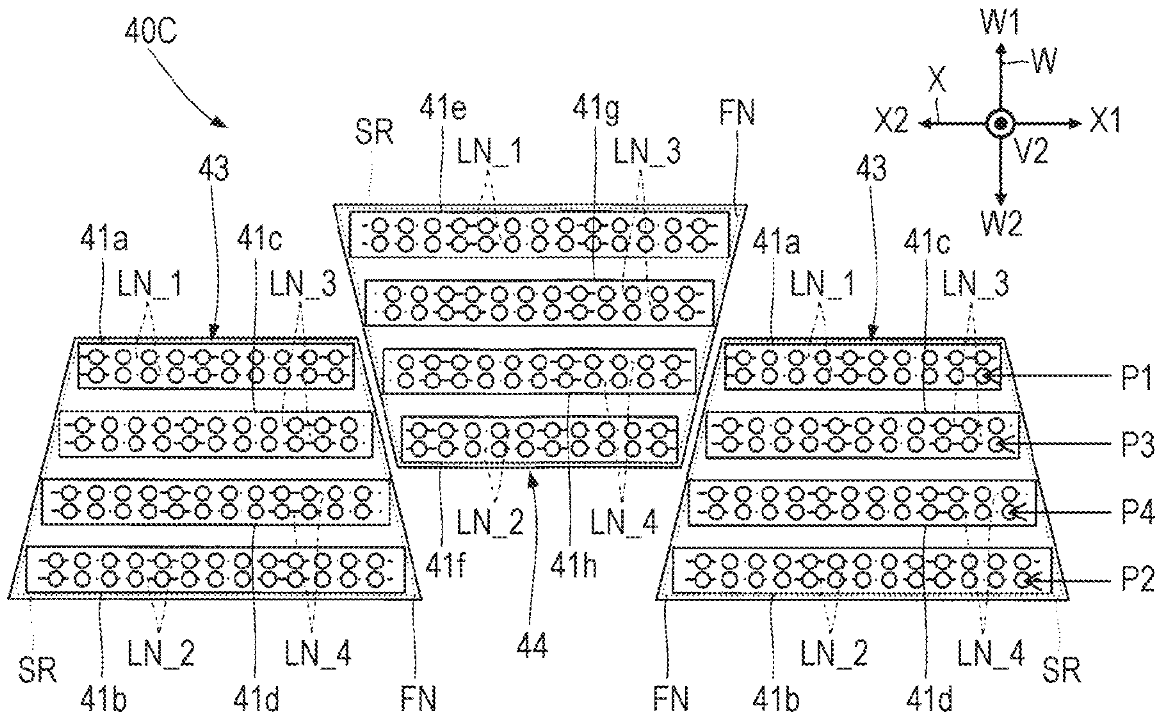
FIG. 6 is a plan view of a liquid ejecting head of a fourth embodiment.

FIG. 6 is a plan view of a liquid ejecting head 40C of the fourth embodiment. FIG. 6 schematically illustrates the liquid ejecting head 40C when the ejection surface FN is viewed in a plan view at the time of capping, that is, when the liquid ejecting head 40B is in an inclined posture. The present embodiment is the same as the above-described first embodiment except that the liquid ejecting head 40C is provided instead of the liquid ejecting head 40.

The liquid ejecting head 40C is composed of two heads 43 and one head 44. In addition, one or both of the two heads 43 may be integrated with the head 44. Further, the number of heads 43 and the number of heads 44 may be any number, and two or more heads 43 and two or more heads 44 may be arranged in a staggered manner along the X axis. Furthermore, the head 43 and the head 44 may be arranged at the same position with respect to the W1 direction.

Each head 43 has head chips 41*a*, 41*b*, 41*c*, and 41*d*. These are arranged side by side in the W1 direction in the order of the head chip 41*b*, the head chip 41*d*, the head chip 41*c*, and the head chip 41*a*. In addition, at least two of the head chips 41*a*, 41*b*, 41*c*, and 41*d* may be integrated.

The head chip 41*a* has the nozzle row LN_1 composed of the plurality of nozzles N_1 arranged in the direction along the X axis. The nozzle N_1 is the nozzle N for ejecting the first ink. The head chip 41*b* has the nozzle row LN_2 composed of the plurality of nozzles N_2 arranged in the direction along the X axis. The nozzle row LN_2 is the nozzle N for ejecting the second ink. The head chip 41*c* has the nozzle row LN_3 composed of the plurality of nozzles N_3 arranged in the direction along the X axis. The nozzle N_3 is the nozzle N for ejecting the third ink. The head chip 41*d* has the nozzle row LN_4 composed of the plurality of nozzles N_4 arranged in the direction along the X axis. The nozzle row LN_4 is the nozzle N for ejecting the fourth ink.

Here, each length of the head chips 41*a*, 41*b*, 41*c*, and 41*d* in the direction along the X axis is in the order of the head chip 41*b*, the head chip 41*d*, the head chip 41*c*, and the head chip 41*a* from the longest to the shortest.

The head 44 has the same configuration as that of the head 43 described above, except that the postures around the V axis differ by 180° and the configuration is changed according to the change in the posture. Specifically speaking, the head 44 has head chips 41*e*, 41*f*, 41*g*, and 41*h*. These are arranged side by side in the W1 direction in the order of the head chip 41*f*, the head chip 41*h*, the head chip 41*g*, and the head chip 41*e*. In addition, at least two of the head chips 41*e*, 41*f*, 41*g*, and 41*h* may be integrated.

The head chip 41*e* has the nozzle row LN_1 composed of the plurality of nozzles N_1 arranged in the direction along the X axis. The nozzle N_1 is the nozzle N for ejecting the first ink. The head chip 41*f* has the nozzle row LN_2 composed of the plurality of nozzles N_2 arranged in the direction along the X axis. The nozzle row LN_2 is the nozzle N for ejecting the second ink. The head chip 41*g* has the nozzle row LN_3 composed of the plurality of nozzles N_3 arranged in the direction along the X axis. The nozzle N_3 is the nozzle N for ejecting the third ink. The head chip 41*h* has the nozzle row LN_4 composed of the plurality of nozzles N_4 arranged in the direction along the X axis. The nozzle row LN_4 is the nozzle N for ejecting the fourth ink.

Here, each length of the head chips 41*e*, 41*f*, 41*g*, and 41*h* in the direction along the X axis is in the order of the head chip 41*e*, the head chip 41*g*, the head chip 41*h*, and the head chip 41*f* from the longest to the shortest.

The cap 61 (not illustrated) is provided for each of the heads 43 and 44, and the side wall 61*b* of the cap 61 comes into contact with the seal region SR corresponding to each of the heads 43 and 44 illustrated in FIG. 6. The seal region SR and the side wall 61*b* of the cap 61 may not be in contact with each other.

When focusing on the head 43 covered by one cap 61, the positions of each of the nozzle rows LN in the vertical direction are in the order of nozzle rows LN_2, LN_4, LN_3, and LN_1 from the bottom to the top. In addition, even when focusing on the head 44 covered by one cap 61, similarly, the positions of each of the nozzle rows LN in the vertical direction are in the order of nozzle rows LN_2, LN_4, LN_3, and LN_1 from the bottom to the top.

Also in the above-described fourth embodiment, the difference between the thickening of the first ink and the thickening of the second ink can be reduced as in the above-described first embodiment.

5. Fifth Embodiment

Hereinafter, a fifth embodiment of the present disclosure will be described. In the embodiment illustrated below, elements having the same effects and functions as those of the first embodiment will be given the reference numerals used in the description of the first embodiment, and each of the detailed descriptions thereof will be appropriately omitted.

Figure 7:
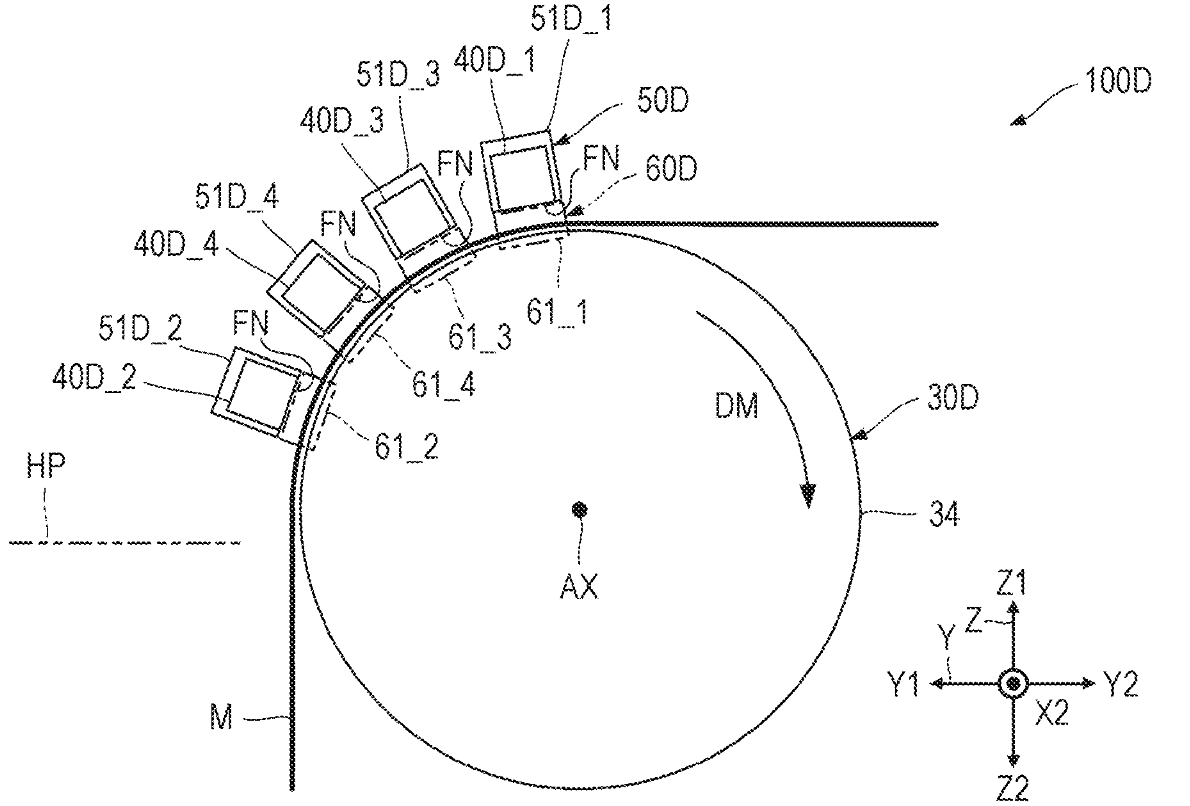
FIG. 7 is a schematic view illustrating a configuration example of a liquid ejecting apparatus according to a fifth embodiment.

FIG. 7 is a schematic view illustrating a configuration example of a liquid ejecting apparatus 100D according to a fifth embodiment. The liquid ejecting apparatus 100D is the same as the liquid ejecting apparatus 100 of the above-described first embodiment except that a transport mechanism 30D, a plurality of liquid ejecting heads 40D_1 to 40D_4, a support mechanism 50D, and a maintenance mechanism 60D are provided instead of the transport mechanism 30, the liquid ejecting head 40, the support mechanism 50, and the maintenance mechanism 60. The liquid ejecting head 40D_1 is an example of the "first liquid ejecting head". The liquid ejecting head 40D_2 is an example of the "second liquid ejecting head". The liquid ejecting head 40D_3 is an example of the "third liquid ejecting head". The liquid ejecting head 40D_4 is an example of the "fourth liquid ejecting head". Further, in the following, the liquid ejecting heads 40D_1 to 40D_4 may be referred to as the liquid ejecting head 40D without distinguishing the liquid ejecting heads.

As illustrated in FIG. 7, the transport mechanism 30D has a drum 34 that transports the medium M in a state where the medium M is attracted to the outer peripheral surface. The drum 34 is a cylindrical or columnar member having an outer peripheral surface along a central axis AX parallel to the X axis. The drum 34 is rotationally driven around the central axis AX by a driving mechanism such as a motor (not illustrated). The outer peripheral surface of the drum 34 is charged by a charger (not illustrated). The medium M is electrostatically attracted to the outer peripheral surface of the drum 34 by using the electrostatic force generated by this charging.

The liquid ejecting heads 40D_1, 40D_2, 40D_3, and 40D_4 face each other on the outer peripheral surface of the drum 34. Each of the liquid ejecting heads 40D_1, 40D_2, 40D_3, and 40D_4 is configured in the same manner as the liquid ejecting head 40 of the above-described first embodiment.

However, in the liquid ejecting heads 40D_1, 40D_2, 40D_3, and 40D_4, the postures around the axis parallel to the X axis are different from each other. Further, the types of ink used for the liquid ejecting heads 40D_1, 40D_2, 40D_3, and 40D_4 are different from each other. Specifically, the thickening resistances of ink used for the liquid ejecting heads 40D_1, 40D_2, 40D_3, and 40D_4 are different from each other. Here, for example, when the colors of ink used for the liquid ejecting heads 40D_1, 40D_2, 40D_3, and 40D_4 are different for each head, four colors of ink of yellow, magenta, cyan, and black are used.

Specifically speaking, the liquid ejecting heads 40D_1, 40D_2, 40D_3, and 40D_4 are aligned in the order of the liquid ejecting head 40D_2, the liquid ejecting head 40D_4, the liquid ejecting head 40D_3, and the liquid ejecting head 40D_1 in a direction DM along the outer peripheral surface of the drum 34.

Here, the angle formed by the horizontal plane HP and the ejection surface FN is in the order of the liquid ejecting head 40D_1, the liquid ejecting head 40D_3, the liquid ejecting head 40D_4, and the liquid ejecting head 40D_2 from the smallest to the largest.

The support mechanism 50D is a mechanism for supporting the liquid ejecting heads 40D_1, 40D_2, 40D_3, and 40D_4. The support mechanism 50D has supports 51D_1, 51D_2, 51D_3, and 51D_4. The support 51D_1 is a member such as a frame that supports the liquid ejecting head 40D_1. The support 51D_2 is a member such as a frame that supports the liquid ejecting head 40D_2. The support 51D_3 is a member such as a frame that supports the liquid ejecting head 40D_3. The support 51D_4 is a member such as a frame that supports the liquid ejecting head 40D_4.

Although not illustrated, the support mechanism 50D has a driving mechanism for changing the positions of the supports 51D_1, 51D_2, 51D_3, and 51D_4. As described above, the driving mechanism moves the supports 51D_1, 51D_2, 51D_3, and 51D_4 in the direction along the X axis while keeping the ejection surface FN inclined with respect to the horizontal plane HP. Accordingly, it is possible to switch between a state where the ejection surface FN faces the outer peripheral surface of the drum 34 and a state where the ejection surface FN faces caps 61_1 to 61_4 described later. In a state where the ejection surface FN faces the outer peripheral surface of the drum 34, printing on the medium M is performed by the liquid ejecting heads 40D_1, 40D_2, 40D_3, and 40D_4. In a state where the ejection surface FN faces the caps 61_1 to 61_4 described later, the maintenance mechanism 60D maintains the liquid ejecting heads 40D_1, 40D_2, 40D_3, and 40D_4.

The maintenance mechanism 60D is a mechanism used for the maintenance operation of the liquid ejecting heads 40D_1, 40D_2, 40D_3, and 40D_4. The maintenance mechanism 60D has the caps 61_1 to 61_4. The cap 61_1 is an example of the "first cap". The cap 61_2 is an example of the "second cap". The cap 61_3 is an example of the "third cap". The cap 61_4 is an example of the "fourth cap".

Each of the caps 61_1 to 61_4 illustrated by the two-dot chain line in FIG. 7 is arranged at a position in the X1 direction or the X2 direction with respect to the drum 34. The cap 61_1 is a recessed member that covers the ejection surface FN of the liquid ejecting head 40D_1 during the maintenance operation of the maintenance mechanism 60D. The cap 61_2 is a recessed member that covers the ejection surface FN of the liquid ejecting head 40D_2 during the maintenance operation of the maintenance mechanism 60D. The cap 61_3 is a recessed member that covers the ejection surface FN of the liquid ejecting head 40D_3 during the maintenance operation of the maintenance mechanism 60D. The cap 61_4 is a recessed member that covers the ejection surface FN of the liquid ejecting head 40D_4 during the maintenance operation of the maintenance mechanism 60D. Each of the caps 61_1 to 61_4 is configured in the same manner as the cap 61 of the above-described first embodiment.

Figure 8:
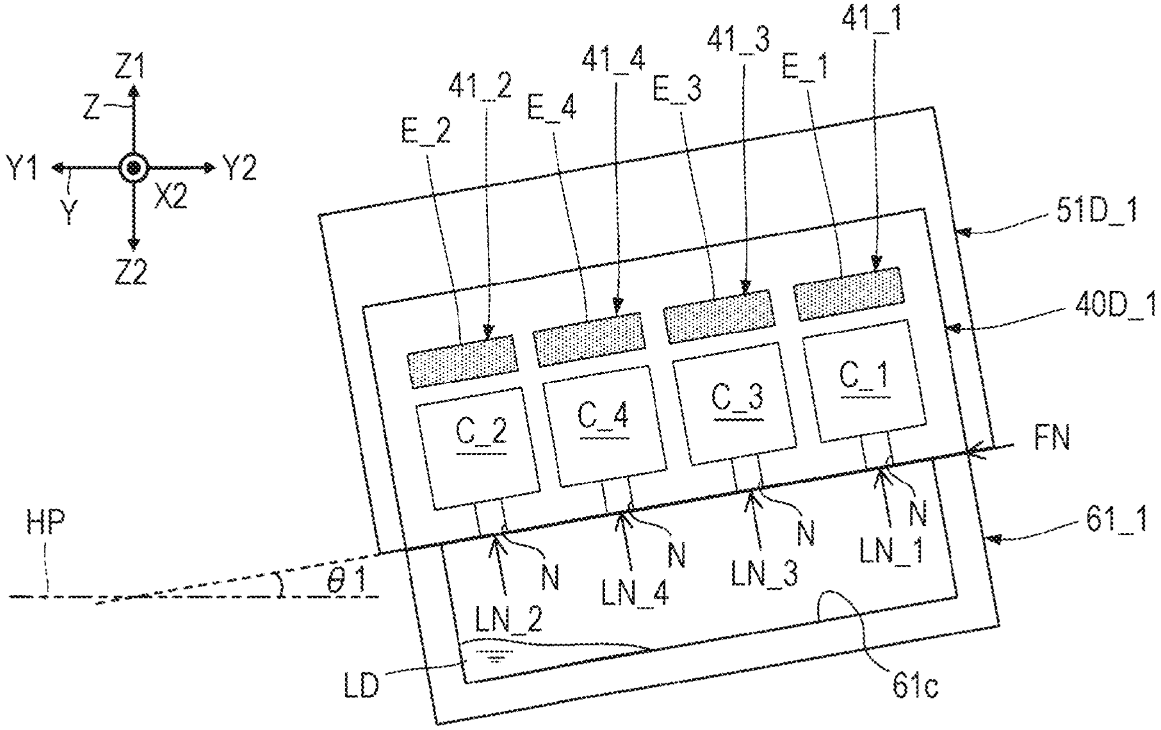
FIG. 8 is a view schematically illustrating a first liquid ejecting head at the time of capping.
Figure 9:
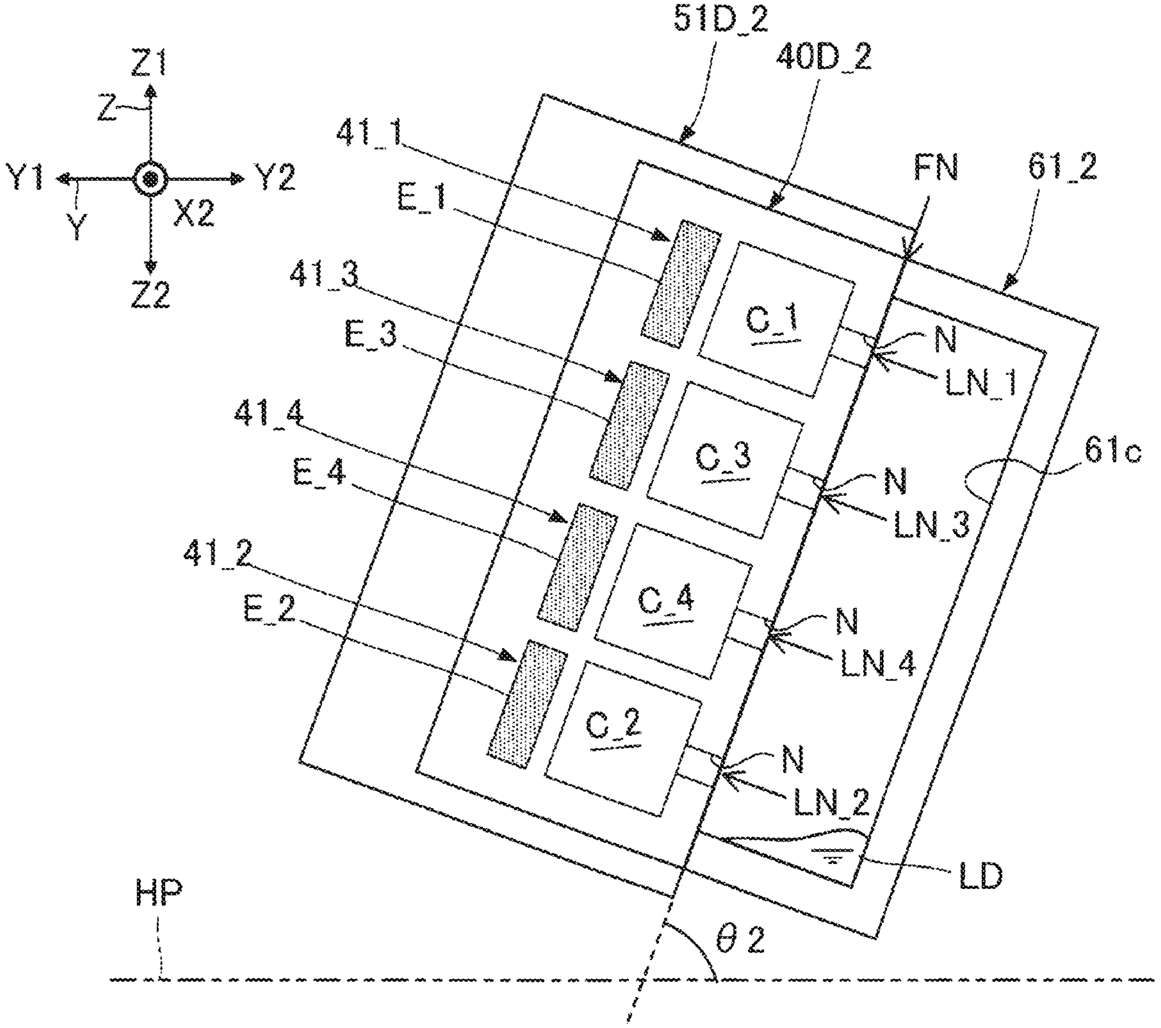
FIG. 9 is a view schematically illustrating a second liquid ejecting head at the time of capping.

FIG. 8 is a view schematically illustrating the liquid ejecting head 40D_1 which is an example of the first liquid ejecting head at the time of capping. FIG. 9 is a view schematically illustrating the liquid ejecting head 40D_2 which is an example of the second liquid ejecting head at the time of capping. As illustrated in FIG. 8, the ejection surface FN of the liquid ejecting head 40D_1 at the time of capping is covered with the cap 61_1 in a state of being inclined at an angle θ1 with respect to the horizontal plane HP. On the other hand, as illustrated in FIG. 9, the ejection surface FN of the liquid ejecting head 40D_2 at the time of capping is covered with the cap 61_2 in a state of being inclined at an angle θ2 larger than the angle θ1 with respect to the horizontal plane HP.

Due to the relationship between the angle θ1 and the angle θ2, the inclination angle of the cap 61_2 with respect to the horizontal plane HP is larger than the inclination angle of the cap 61_1 with respect to the horizontal plane HP. Therefore, the hygroscopic liquid LD in the cap 61_2 is unevenly distributed to be collected closer to the nozzle row LN_2 than the hygroscopic liquid LD in the cap 61_1. In other words, the hygroscopic liquid LD in the cap 61_1 spreads over a wide range along the horizontal plane HP to be closer to each nozzle row LN than the hygroscopic liquid LD in the cap 61_2. As a result, the distance between each nozzle row LN of the liquid ejecting head 40D_2 during capping and the hygroscopic liquid LD is larger than the distance between each of the corresponding nozzle rows LN of the liquid ejecting head 40D_1 during capping and the hygroscopic liquid LD. Therefore, when the thickening resistance of the ink used for the liquid ejecting head 40D_1 and the thickening resistance of the ink used for the liquid ejecting head 40D_2 are equal to each other, the ink in the liquid ejecting head 40D_2 more easily thickens than the ink in the liquid ejecting head 40D_1. As a result, the difference in thickening of ink between these liquid ejecting heads becomes large.

Therefore, the thickening resistance of the ink used for the liquid ejecting head 40D_2 is higher than the thickening resistance of the ink used for the liquid ejecting head 40D_1. In other words, the liquid ejecting head 40D_1 uses the above-mentioned first ink, whereas the liquid ejecting head 40D_2 uses the second ink having a higher thickening resistance than that of the first ink. Therefore, the difference in thickening of ink between these heads can be reduced. From the same viewpoint, the above-mentioned third ink is used for the liquid ejecting head 40D_3. Further, the above-mentioned fourth ink is used for the liquid ejecting head 40D_4.

Here, the nozzle N included in the liquid ejecting head 40D_1 is an example of the "first nozzle" and ejects the first ink. The nozzle N included in the liquid ejecting head 40D_2 is an example of the "second nozzle" and ejects the second ink. The nozzle N included in the liquid ejecting head 40D_3 is an example of the "third nozzle" and ejects the third ink. The nozzle N included in the liquid ejecting head 40D_4 is an example of the "fourth nozzle" and ejects the fourth ink.

Also in the above-described fifth embodiment, the difference between the thickening of the first ink and the thickening of the second ink can be reduced. In the present embodiment, as described above, the thickening resistances of the ink used for the liquid ejecting heads 40D_1 to 40D_4 are different from each other. Specifically, the liquid ejecting apparatus 100D includes, for example, the liquid ejecting head 40D_1 which is an example of the "first liquid ejecting head", the liquid ejecting head 40D_2 which is an example of the "second liquid ejecting head", the cap 61_1 which is an example of the "first cap", and the cap 61_2 which is an example of the "second cap". The liquid ejecting head 40D_1 has the ejection surface FN including the plurality of nozzles N for ejecting the first ink. The nozzle N of the liquid ejecting head 40D_1 is an example of the "first nozzle", and the ejection surface FN of the liquid ejecting head 40D_1 is an example of the "first ejection surface". The liquid ejecting head 40D_2 has the ejection surface FN including the plurality of nozzles N for ejecting the second ink. The nozzle N of the liquid ejecting head 40D_2 is an example of the "second nozzle", and the ejection surface FN of the liquid ejecting head 40D_2 is an example of the "second ejection surface". The cap 61_1 has a recessed shape that covers the ejection surface FN in the first posture of the liquid ejecting head 40D_1 in which the angle θ1 formed by the ejection surface FN of the liquid ejecting head 40D_1 and the horizontal plane HP is the first angle. The cap 61_2 has a recessed shape that covers the ejection surface FN in the second posture of the liquid ejecting head 40D_2 in which the angle θ2 formed by the ejection surface FN of the liquid ejecting head 40D_2 and the horizontal plane HP is the second angle larger than the first angle. In addition, the first ink and the second ink respectively contains a moisturizer, and the thickening resistance of the second ink is higher than the thickening resistance of the first ink.

As described above, the larger the angle formed by the ejection surface FN and the horizontal plane HP, the larger the difference in thickening of ink between the nozzles N in the liquid ejecting head 40D tends to be. Therefore, by making the thickening resistance of the second ink higher than the thickening resistance of the first ink, the difference in thickening of the second ink between the nozzles N of the liquid ejecting head 40D_2 can be reduced to be closer to the difference in thickening of the first ink between the nozzles N of the liquid ejecting head 40D_1. As a result, it is possible to reduce the difference in thickening of the ink between the nozzle row LN of the liquid ejecting head 40D_1 and the nozzle row LN of the liquid ejecting head 40D_2.

Here, as described in the first embodiment, it is preferable that the effective water content of the second ink be smaller than the effective water content of the first ink. In this case, the thickening resistance of the second ink can be made higher than the thickening resistance of the first ink.

Further, as described in the first embodiment, it is preferable that the hygroscopicity of the second ink be higher than the hygroscopicity of the first ink. In this case, the thickening resistance of the second ink can be made higher than the thickening resistance of the first ink.

5. Modification Example

The embodiments exemplified above can be modified in various manners. Specific modifications according to the above-described embodiments will be described below. Two or more aspects selected in any manner from the following examples can be appropriately combined with each other within a range of not being inconsistent with each other.

5-1. Modification Example 1

Figure 10:
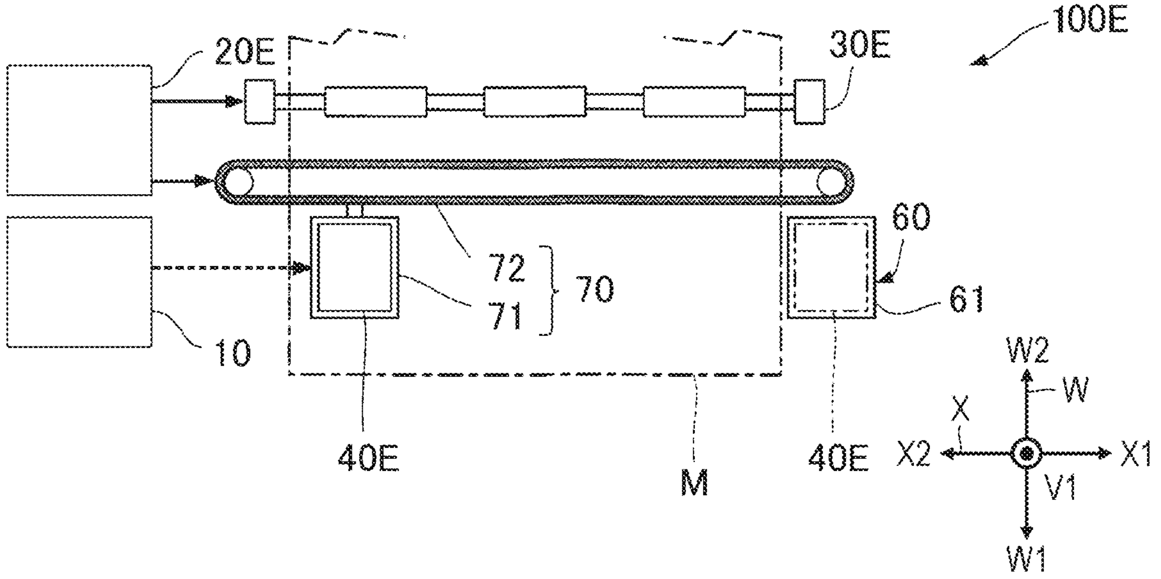
FIG. 10 is a schematic view illustrating a configuration example of a liquid ejecting apparatus according to Modification Example 1.

FIG. 10 is a schematic view illustrating a configuration example of a liquid ejecting apparatus 100E according to Modification Example 1. The liquid ejecting apparatus 100E is a serial type printing apparatus. As illustrated in FIG. 10, the liquid ejecting apparatus 100E includes the liquid container 10, a control unit 20E, a transport mechanism 30E, a moving mechanism 70, a liquid ejecting head 40E, and the maintenance mechanism 60. Here, the liquid ejecting head 40E is configured in the same manner, for example, as the liquid ejecting head 40A of the second embodiment or the liquid ejecting head 40B of the third embodiment, which are described above.

The transport mechanism 30E transports the medium M in the W1 direction or the W2 direction along the W axis under the control of the control unit 20E. The W axis of this modification example is the axis that intersects the horizontal plane HP as in the first embodiment. The moving mechanism 70 reciprocates the liquid ejecting head 40E in the X1 direction and the X2 direction under the control of the control unit 20E. In the example illustrated in FIG. 10, the moving mechanism 70 includes a substantially box-shaped support 71 called a carriage for accommodating the liquid ejecting head 40E, and a transport belt 72 to which the support 71 is fixed. The support 71 supports the liquid ejecting head 40E in an inclined posture during both the recording operation and the capping, as in the case of the support 51 during capping described above. In addition to the liquid ejecting head 40E, the liquid container 10 may be mounted on the support 71.

In the present embodiment, the maintenance mechanism 60 is arranged at a position in the X1 direction with respect to the transport region of the medium M. The moving mechanism 70 positions the liquid ejecting head 40E on the cap 61 of the maintenance mechanism 60 during the maintenance operation by the maintenance mechanism 60.

Under the control of the control unit 20E, the liquid ejecting head 40E ejects the ink supplied from the liquid container 10 toward the medium M. Although not illustrated, the direction of this ejection is the above-mentioned V2 direction. By performing this ejection in parallel with the transport of the medium M by the transport mechanism 30E and the reciprocating movement of the liquid ejecting head 40E by the moving mechanism 70, a predetermined image is formed by ink on the surface of the medium M.

Also in the above-described Modification Example 1, the difference between the thickening of the first ink and the thickening of the second ink can be reduced.

5-2. Modification Example 2

In the above-described first embodiment, the case where the nozzle row LN_1 is regarded as the "first nozzle row" and the nozzle row LN_2 is regarded as the "second nozzle row" is exemplified, but the first nozzle row and the second nozzle row are not limited to this example. Specifically, any one of the nozzle rows LN_1, LN_3, and LN_4 may be regarded as the "first nozzle row". In this case, the nozzle row LN positioned below one nozzle row LN in the vertical direction in an inclined posture may be regarded as the "second nozzle row". As described above, the "second nozzle row" is not limited to the nozzle row LN_2, and may be the nozzle row LN_3 or the nozzle row LN_4.

Further, the arrangement, number, length, and the like of the nozzle rows may be any aspect including the first nozzle row and the second nozzle row having different positions in the vertical direction, and are not limited to the above-described embodiments.

Figure 11:
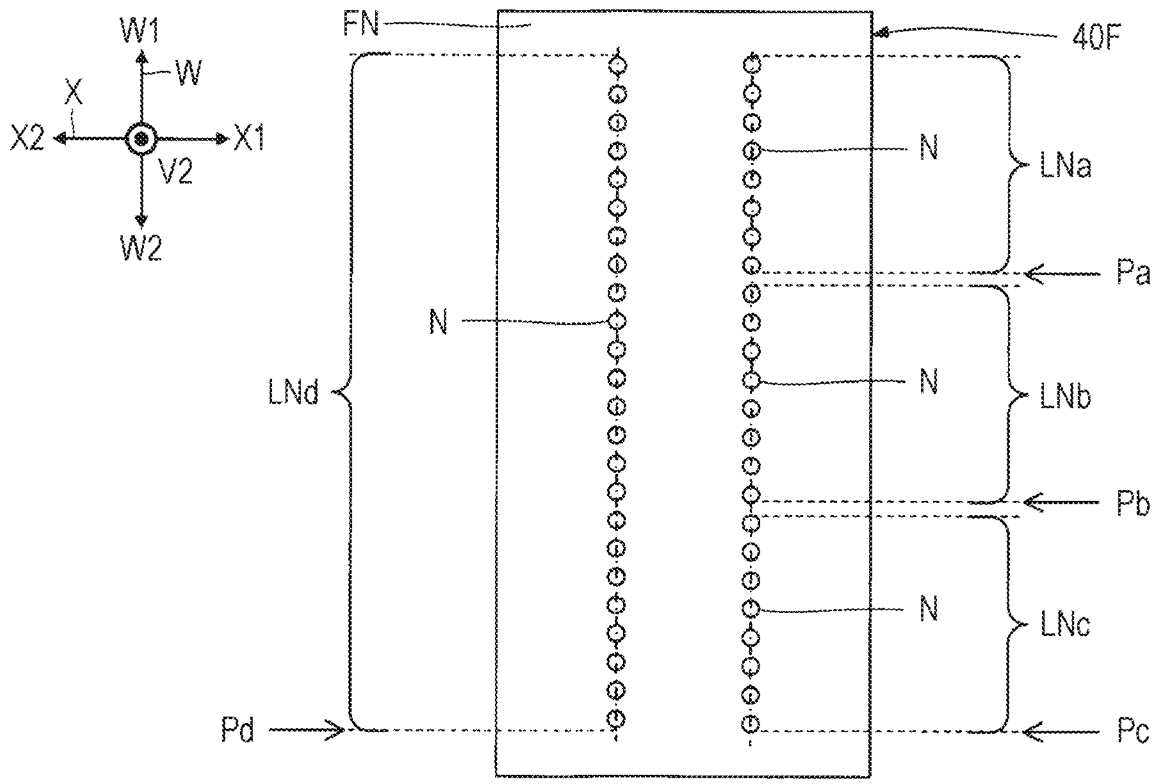
FIG. 11 is a plan view of a liquid ejecting head of Modification Example 2.

FIG. 11 is a plan view of a liquid ejecting head 40F of Modification Example 2. FIG. 11 schematically illustrates the liquid ejecting head 40F when the ejection surface FN is viewed in a plan view in an inclined posture, that is, at the time of capping. The liquid ejecting head 40F is used in, for example, a serial type printing apparatus as illustrated in Modification Example 1, and has nozzle rows LNa, LNb, LNc, and LNd extending in a direction along the W axis. Each of these nozzle rows is composed of the nozzles N arranged in the direction along the X axis.

The nozzle row LNa, the nozzle row LNb, and the nozzle row LNc are arranged side by side on the same straight line in the W2 direction in this order. Therefore, a position Pa of the nozzle row LNa in the vertical direction is above a position Pb of the nozzle row LNb in the vertical direction and above a position Pc of the nozzle row LNc in the vertical direction. Further, the position Pb of the nozzle row LNb in the vertical direction is equal to the position Pc of the nozzle row LNc in the vertical direction. Furthermore, the position Pd of the nozzle row LNd in the vertical direction is equal to the position Pc of the nozzle row LNc in the vertical direction.

Here, the nozzle row LNa or the nozzle row LNb is the "first nozzle row" and ejects the first ink. When the nozzle row LNa is regarded as the "first nozzle row", any one of the nozzle rows LNb, LNc, and LNd is the "second nozzle row" and ejects the second ink. Here, when any one of the nozzle rows LNc and LNd is regarded as the "second nozzle row", the nozzle row LNb is the "third nozzle row" and ejects the third ink. Meanwhile, when the nozzle row LNb is regarded as the "first nozzle row", any one of the nozzle rows LNc and LNd is the "second nozzle row" and ejects the second ink.

5-3. Modification Example 3

In the above-described first embodiment, the posture of the liquid ejecting head 40 during the recording operation and the posture of the liquid ejecting head 40 during the maintenance operation are different from each other, but the posture of the liquid ejecting head 40 during the recording operation and the posture of the liquid ejecting head 40 during the maintenance operation may be the same as each other. In this case, the ejection surface FN is inclined with respect to the horizontal plane HP even during the recording operation. Further, in this case, for example, the maintenance mechanism 60 is appropriately configured such that the maintenance mechanism 60 can maintain the liquid ejecting head 40.

5-4. Modification Example 4

In the above-described first embodiment, the liquid ejecting head 40 during the maintenance operation is in an inclined posture, but the liquid ejecting head 40 during the maintenance operation may not be in an inclined posture, and for example, the liquid ejecting head 40 may be in an inclined posture only during the recording operation.

5-5. Modification Example 5

The liquid ejecting apparatus 100 exemplified in each of the above-described embodiments can be adopted in various devices such as a facsimile machine and a copier, in addition to a device dedicated to printing. However, the application of the liquid ejecting apparatus of the present disclosure is not limited to printing. For example, a liquid ejecting apparatus that injects a solution of a coloring material is used as a manufacturing device for forming a color filter of a liquid crystal display device. Further, a liquid ejecting apparatus that injects a solution of a conductive material is used as a manufacturing device for forming wiring or electrodes on a wiring substrate.

Example

Hereinafter, specific examples of the present disclosure will be described. The present disclosure is not limited to the following examples.

A: Ink Preparation

A-1: Black Ink Preparation

A-1a: Dispersion Liquid Preparation

First, an anionic polymer P-1 [styrene/butyl acrylate/acrylic acid copolymer (polymerization ratio (mass ratio) =30/40/30) acid value 202, weight average molecular weight 6500] was prepared. This was neutralized with an aqueous solution of potassium hydroxide and diluted with ion-exchanged water to prepare a homogeneous 10% by mass polymer aqueous solution.

The prepared polymer solution (600 g), carbon black (100 g), and ion-exchanged water (300 g) were mixed, mechanically stirred for a predetermined time, and then the non-dispersion product containing coarse particles was removed by centrifugation treatment to obtain a black dispersion liquid. The obtained black dispersion liquid had a pigment concentration of 10% by mass.

A-1b: Ink Preparation

After adding other components to the obtained black dispersion liquid at the following compounding ratio and thoroughly mixing and stirring, pressure filtration was performed with a microfilter (manufactured by Fujifilm) with a pore size of 2.5 μm to obtain a black ink having a pigment concentration of 2.5% by mass.

Black dispersion liquid: 25 parts by mass

Zonyl FSO-100 (manufactured by DuPont): 0.05 parts by mass

Glycerin: 8 parts by mass 2-pyrrolidone: 6 parts by mass

Acetylenic glycol EO adduct (manufactured by Kawaken Fine Chemicals Co., Ltd.): 0.5 parts by mass Trimethylolpropane: 3 parts by mass Ion-exchanged water: residue (=57.45 parts by mass)

A-2: Cyan Ink Preparation

A-2a: Dispersion Liquid Preparation

First, using benzyl acrylate and methacrylic acid as raw materials, an AB type block polymer having an acid value of 250 and a number average molecular weight of 3000 was prepared by a conventional method, neutralized with an aqueous solution of potassium hydroxide, and diluted with ion-exchanged water to prepare a homogeneous 50% by mass polymer aqueous solution.

The prepared polymer solution (200 g), C.I. Pigment Blue 15:3 (100 g), and ion-exchanged water (700 g) were mixed and mechanically stirred for a predetermined time, and then the non-dispersion product containing coarse particles was removed by centrifugation treatment to obtain a cyan dispersion liquid. The obtained cyan dispersion liquid had a pigment concentration of 10% by mass.

A-2b: Ink Preparation

After adding other components to the obtained cyan dispersion liquid at the following compounding ratio and thoroughly mixing and stirring, pressure filtration was performed with a microfilter (manufactured by Fujifilm) with a pore size of 2.5 μm to obtain a cyan ink having a pigment concentration of 2.5% by mass.

Cyan dispersion liquid: 25 parts by mass

Zonyl FSO-100 (manufactured by DuPont): 0.05 parts by mass

Glycerin: 15 parts by mass 2-pyrrolidone: 5 parts by mass

Acetylenic glycol EO adduct (manufactured by Kawaken Fine Chemicals Co., Ltd.): 0.5 parts by mass Triethanolamine: 1 part by mass Ion-exchanged water: residue (=53.45 parts by mass)

A-3: Magenta Ink Preparation

A-3a: Dispersion Liquid Preparation

First, using benzyl acrylate and methacrylic acid as raw materials, an AB type block polymer having an acid value of 300 and a number average molecular weight of 2500 was prepared by a conventional method, neutralized with an aqueous solution of potassium hydroxide, and diluted with ion-exchanged water to prepare a homogeneous 50% by mass polymer aqueous solution.

The prepared polymer solution (100 g), C.I. Pigment Red 122 (100 g), and ion-exchanged water (800 g) were mixed and mechanically stirred for a predetermined time, and then the non-dispersion product containing coarse particles was removed by centrifugation treatment to obtain a magenta dispersion liquid. The obtained magenta dispersion liquid had a pigment concentration of 10% by mass.

A-3b: Ink Preparation

After adding other components to the obtained magenta dispersion liquid at the following compounding ratio and thoroughly mixing and stirring, pressure filtration was performed with a microfilter (manufactured by Fujifilm) with a pore size of 2.5 μm to obtain a magenta ink having a pigment concentration of 2.5% by mass.

Magenta dispersion liquid: 25 parts by mass

Zonyl FSO-100 (manufactured by DuPont): 0.05 parts by mass

Glycerin: 12 parts by mass 2-pyrrolidone: 5 parts by mass

Acetylenic glycol EO adduct (manufactured by Kawaken Fine Chemicals Co., Ltd.): 0.5 parts by mass Triethanolamine: 2 parts by mass
Trimethylolpropane: 1 part by mass
Ion-exchanged water: residue (=54.45 parts by mass)

A-4: Yellow Ink Preparation

A-4a: Dispersion Liquid Preparation

First, the same anionic polymer P-1 used for preparing the black ink was neutralized with an aqueous solution of potassium hydroxide, and diluted with ion-exchanged water to prepare a homogeneous 10% by mass polymer aqueous solution.

The prepared polymer solution (300 g), C.I. Pigment Yellow 74 (100 g), and ion-exchanged water (600 g) were mixed and mechanically stirred for a predetermined time, and then the non-dispersion product containing coarse particles was removed by centrifugation treatment to obtain a yellow dispersion liquid. The obtained yellow dispersion liquid had a pigment concentration of 10% by mass.

A-4b: Ink Preparation

After adding other components to the obtained yellow dispersion liquid at the following compounding ratio and thoroughly mixing and stirring, pressure filtration was performed with a microfilter (manufactured by Fujifilm) with a pore size of 1.0 μm to obtain a yellow ink having a pigment concentration of 2.5% by mass.

Yellow dispersion liquid: 25 parts by mass
Zonyl FSO-100 (manufactured by DuPont): 0.25 parts by mass
Glycerin: 10 parts by mass
2-pyrrolidone: 1 part by mass
Acetylenic glycol EO adduct (manufactured by Kawaken Fine Chemicals Co., Ltd.): 1 part by mass
Triethanolamine: 7 parts by mass
Sodium carbonate: 0.5 parts by mass
Ion-exchanged water: residue (=52.75 parts by mass)

As described above, black ink, cyan ink, magenta ink, and yellow ink were obtained. The compositions of these inks are summarized in Table 1. Table 1 also shows the effective water content and hygroscopicity of each ink.

evaluate the thickening of the ink. When the ink in the vicinity of the nozzle is thickened, the responsiveness of the ink deteriorates, and thus the ink injection speed decreases, that is, the arrival time of the ink on the medium becomes slow. Therefore, it can be said that the larger the deviation of the landing position, the greater the thickening. The thickening of the ink may be evaluated by observing the vicinity of the nozzle with a high-speed camera or the like. The angle θ between the horizontal plane and the ejection surface was set to 45°, and glycerin was placed as a hygroscopic liquid in the lower portion of the cap.

When the black ink is used as the first ink, the cyan ink is used as the second ink, the yellow ink is used as the third ink, and the magenta ink is used as the fourth ink, it was confirmed that the difference in thickening of the ink between the nozzles was smaller than that when the black ink is used as the second ink, the cyan ink is used as the first ink, the yellow ink is used as the fourth ink, and the magenta ink is used as the third ink.

What is claimed is:

1. A liquid ejecting apparatus comprising:

a first liquid ejecting head having a first ejection surface including first nozzles configured to eject a first ink in a first posture in which an angle formed by the first ejection surface and a horizontal plane is a first angle; and a second liquid ejecting head having a second ejection surface including second nozzles configured to eject a second ink in a second posture in which an angle formed by the second ejection surface and the horizontal plane is a second angle larger than the first angle, wherein a thickening resistance of the second ink is higher than a thickening resistance of the first ink.

2. The liquid ejecting apparatus according to claim 1, wherein an effective water content of the second ink is smaller than an effective water content of the first ink.

TABLE 1

| | | | Cyan | Magenta | Yellow | Black |
|---|---|---|---|---|---|---|
| Ink composition [parts by mass] | Pigment | Cyan dispersion liquid | 25 | | | |
| | | Magenta dispersion liquid | | 25 | | |
| | | Yellow dispersion liquid | | | 25 | |
| | | Black dispersion liquid | | | | 25 |
| | Surfactant | Zonyl FSO-100 | 0.05 | 0.05 | 0.25 | 0.05 |
| | | Acetylenic glycol EO adduct | 0.5 | 0.5 | 1 | 0.5 |
| | Moisturizer | Glycerin | 15 | 12 | 10 | 8 |
| | | 2-pyrrolidone | 5 | 5 | 1 | 6 |
| | | Triethanolamine | 1 | 2 | 7 | |
| | | Trimethylolpropane | | 1 | | 3 |
| | Dispersion stabilizer | Sodium carbonate | | | 0.5 | |
| | | Water | 53.45 | 54.45 | 55.25 | 57.45 |
| | | Total | 100 | 100 | 100 | 100 |
| | Effective water content [%] | | 5.1 | 10.87 | 18.16 | 22.5 |
| | hygroscopicity | | 48.35 | 43.58 | 37.09 | 34.95 |

B: Evaluation

The thickening of the ink when the liquid ejecting head is filled with the black ink, the cyan ink, the magenta ink, and the yellow ink obtained as described above as illustrated in FIG. 2 was evaluated. Here, the liquid ejecting head was left for one week in a state of being sealed with a cap as illustrated in FIG. 3, and then ink was injected from the nozzle to the medium, and the deviation of the landing position of the ink landed on the medium was observed to 3. The liquid ejecting apparatus according to claim 1, wherein hygroscopicity of the second ink is higher than hygroscopicity of the first ink.

4. The liquid ejecting apparatus according to claim 1, further comprising:

a recessed first cap that covers the first ejection surface in the first posture; and a recessed second cap that covers the second ejection surface in the second posture, wherein the first ink and the second ink respectively contains a moisturizer.

5. The liquid ejecting apparatus according to claim 1, further comprising:

a third liquid ejecting head having a third ejection surface including third nozzles configured to eject a third ink in a third posture in which an angle formed by the third ejection surface and the horizontal plane is a third angle larger than the first angle and smaller than the second angle, a thickening resistance of the third ink is higher than the thickening resistance of the first ink and smaller than the thickening resistance of the second ink.

6. The liquid ejecting apparatus according to claim 5, further comprising:

a fourth liquid ejecting head having a fourth ejection surface including fourth nozzles configured to eject a fourth ink in a fourth posture in which an angle formed by the fourth ejection surface and the horizontal plane is a fourth angle larger than the third angle and smaller than the second angle, a thickening resistance of the fourth ink is higher than the thickening resistance of the third ink and smaller than the thickening resistance of the second ink.

7. A liquid ejecting apparatus comprising:

a first liquid ejecting head having a first ejection surface including first nozzles configured to eject a first ink in a first posture in which an angle formed by the first ejection surface and a horizontal plane is a first angle; and a second liquid ejecting head having a second ejection surface including second nozzles configured to eject a second ink in a second posture in which an angle formed by the second ejection surface and the horizontal plane is a second angle larger than the first angle, wherein an effective water content of the second ink is smaller than an effective water content of the first ink.

8. The liquid ejecting apparatus according to claim 7, further comprising:

a recessed first cap that covers the first ejection surface in the first posture; and a recessed second cap that covers the second ejection surface in the second posture, wherein the first ink and the second ink respectively contains a moisturizer.

9. The liquid ejecting apparatus according to claim 7, further comprising:

a third liquid ejecting head having a third ejection surface including third nozzles configured to eject a third ink in a third posture in which an angle formed by the third ejection surface and the horizontal plane is a third angle larger than the first angle and smaller than the second angle, an effective water content of the third ink is smaller than the effective water content of the first ink and higher than the effective water content of the second ink.

10. The liquid ejecting apparatus according to claim 9, further comprising:

a fourth liquid ejecting head having a fourth ejection surface including fourth nozzles configured to eject a fourth ink in a fourth posture in which an angle formed by the fourth ejection surface and the horizontal plane is a fourth angle larger than the third angle and smaller than the second angle, an effective water content of the fourth ink is smaller than the effective water content of the third ink and higher than the effective water content of the second ink.

11. A liquid ejecting apparatus comprising:

a first liquid ejecting head having a first ejection surface including first nozzles configured to eject a first ink in a first posture in which an angle formed by the first ejection surface and a horizontal plane is a first angle; and a second liquid ejecting head having a second ejection surface including second nozzles configured to eject a second ink in a second posture in which an angle formed by the second ejection surface and the horizontal plane is a second angle larger than the first angle, wherein hygroscopicity of the second ink is higher than hygroscopicity of the first ink.

12. The liquid ejecting apparatus according to claim 11, further comprising:

a recessed first cap that covers the first ejection surface in the first posture; and a recessed second cap that covers the second ejection surface in the second posture, wherein the first ink and the second ink respectively contains a moisturizer.

13. The liquid ejecting apparatus according to claim 11, further comprising:

a third liquid ejecting head having a third ejection surface including third nozzles configured to eject a third ink in a third posture in which an angle formed by the third ejection surface and the horizontal plane is a third angle larger than the first angle and smaller than the second angle, hygroscopicity of the third ink is higher than hygroscopicity of the first ink and smaller than hygroscopicity of the second ink.

14. The liquid ejecting apparatus according to claim 13, further comprising:

a fourth liquid ejecting head having a fourth ejection surface including fourth nozzles configured to eject a fourth ink in a fourth posture in which an angle formed by the fourth ejection surface and the horizontal plane is a fourth angle larger than the third angle and smaller than the second angle, hygroscopicity of the fourth ink is higher than hygroscopicity of the third ink and smaller than hygroscopicity of the second ink.

* * * * *